United States Patent
Carter

(10) Patent No.: US 9,606,238 B2
(45) Date of Patent: Mar. 28, 2017

(54) LOW-ENERGY CONSUMPTION LOCATION OF MOVABLE OBJECTS

(71) Applicant: Gatekeeper Systems, Inc., Irvine, CA (US)

(72) Inventor: Scott J. Carter, Seal Beach, CA (US)

(73) Assignee: Gatekeeper Systems, Inc., Irvine, CA (US)

(*) Notice: Subject to any disclaimer, the term of this patent is extended or adjusted under 35 U.S.C. 154(b) by 0 days.

(21) Appl. No.: 15/060,442

(22) Filed: Mar. 3, 2016

(65) Prior Publication Data

US 2016/0259061 A1 Sep. 8, 2016

Related U.S. Application Data

(60) Provisional application No. 62/129,278, filed on Mar. 6, 2015.

(51) Int. Cl.
G01S 19/05 (2010.01)
G01S 19/06 (2010.01)
(Continued)

(52) U.S. Cl.
CPC .............. *G01S 19/05* (2013.01); *G01S 19/06* (2013.01); *G01S 19/09* (2013.01); *G01S 19/11* (2013.01);
(Continued)

(58) Field of Classification Search
CPC .......... G01S 19/05; G01S 19/09; G01S 19/11; G01S 19/252; G01S 19/256; G01S 19/34; G01S 19/06; G01S 19/14
See application file for complete search history.

(56) References Cited

U.S. PATENT DOCUMENTS 4,949,268 A 8/1990 Nishikawa et al.
5,119,102 A 6/1992 Barnard
(Continued)

FOREIGN PATENT DOCUMENTS

WO WO 2013/009465 1/2013
WO WO 2016/144709 9/2016

OTHER PUBLICATIONS

J.L. Weston et al., Modern inertial navigation technology and its application, Electronics & Communication Engineering Journal, vol. 12(2), p. 49-64, 2000.*
(Continued)

*Primary Examiner* — Bernarr Gregory
*Assistant Examiner* — Fred H Mull
(74) *Attorney, Agent, or Firm* — Knobbe, Martens, Olson & Bear, LLP

(57) ABSTRACT

Low-energy consumption techniques for locating a movable object using a global satellite navigation system (GNSS) are provided. A mobile station attached to or included in a movable object can communicate bidirectionally with a fixed base station to determine a location of the movable object. The mobile station may communicate an estimated position to the base station and receive from the base station a set of GNSS satellites that are visible to the mobile station. The mobile station can acquire satellite timing information from GNSS signals from the set of satellites and communicate minimally-processed satellite timing information to the base station. The base station can determine the position of the mobile station and communicate the position back to the mobile station. By offloading much of the processing to the base station, energy consumption of the mobile station is reduced.

30 Claims, 12 Drawing Sheets

(51) Int. Cl.
*G01S 19/09* (2010.01)
*G01S 19/14* (2010.01)
*G01S 19/28* (2010.01)
*G01S 19/34* (2010.01)
*G01S 19/41* (2010.01)
*G01S 19/49* (2010.01)
*H04W 4/02* (2009.01)
*G01S 19/25* (2010.01)
*G01S 19/11* (2010.01)

(52) U.S. Cl.
CPC ............ *G01S 19/14* (2013.01); *G01S 19/252* (2013.01); *G01S 19/256* (2013.01); *G01S 19/28* (2013.01); *G01S 19/34* (2013.01); *H04W 4/02* (2013.01); *H04W 4/028* (2013.01); *G01S 19/41* (2013.01); *G01S 19/49* (2013.01)

(56) References Cited

U.S. PATENT DOCUMENTS

| | | | | |
|---|---|---|---|---|
| 5,225,842 | A * | 7/1993 | Brown | G01S 19/51 342/357.46 |
| 5,247,440 | A | 9/1993 | Capurka et al. | |
| 5,311,194 | A * | 5/1994 | Brown | G01S 19/11 342/357.24 |
| 5,315,290 | A | 5/1994 | Moreno et al. | |
| 5,379,224 | A | 1/1995 | Brown et al. | |
| 5,420,592 | A | 5/1995 | Johnson | |
| 5,638,077 | A | 6/1997 | Martin | |
| 5,663,734 | A * | 9/1997 | Krasner | G01S 5/0027 342/352 |
| 5,739,786 | A | 4/1998 | Greenspan et al. | |
| 5,781,156 | A | 7/1998 | Krasner | |
| 5,841,396 | A | 11/1998 | Krasner | |
| 5,868,100 | A | 2/1999 | Marsh | |
| 5,900,825 | A | 5/1999 | Pressel et al. | |
| 5,936,573 | A | 8/1999 | Smith | |
| 6,024,655 | A | 2/2000 | Coffee | |
| 6,043,748 | A | 3/2000 | Touchton et al. | |
| 6,067,046 | A * | 5/2000 | Nichols | G01C 15/00 342/357.31 |
| 6,097,337 | A | 8/2000 | Bisio | |
| 6,121,928 | A | 9/2000 | Sheynblat et al. | |
| 6,150,980 | A | 11/2000 | Krasner | |
| 6,201,497 | B1 | 3/2001 | Snyder et al. | |
| 6,204,772 | B1 | 3/2001 | DeMay et al. | |
| 6,229,478 | B1 | 5/2001 | Biacs et al. | |
| 6,243,648 | B1 * | 6/2001 | Kilfeather | G01S 5/0036 455/456.1 |
| 6,249,245 | B1 | 6/2001 | Watters et al. | |
| 6,271,757 | B1 | 8/2001 | Touchton et al. | |
| 6,313,786 | B1 | 11/2001 | Sheynblat et al. | |
| 6,415,154 | B1 | 7/2002 | Wang et al. | |
| 6,437,734 | B1 | 8/2002 | Mcburney et al. | |
| 6,446,005 | B1 | 9/2002 | Bingeman et al. | |
| 6,473,030 | B1 | 10/2002 | Mcburney et al. | |
| 6,567,041 | B1 | 5/2003 | O'Dell | |
| 6,603,978 | B1 | 8/2003 | Carlsson et al. | |
| 6,693,586 | B1 | 2/2004 | Walters et al. | |
| 6,701,253 | B2 | 3/2004 | Edwards et al. | |
| 6,725,159 | B2 | 4/2004 | Krasner | |
| 6,928,343 | B2 * | 8/2005 | Cato | G06Q 10/0875 340/5.91 |
| 7,053,823 | B2 | 5/2006 | Cervinka et al. | |
| 7,199,709 | B2 | 4/2007 | Parsons | |
| 7,254,402 | B2 | 8/2007 | Vayanos et al. | |
| 7,463,189 | B2 | 12/2008 | Bryant et al. | |
| 7,616,682 | B2 | 11/2009 | Small | |
| 7,656,291 | B2 | 2/2010 | Rochelle et al. | |
| 7,658,247 | B2 | 2/2010 | Carter | |
| 7,880,676 | B2 | 2/2011 | Ergen et al. | |
| 7,918,190 | B2 | 4/2011 | Belcher et al. | |
| 7,944,368 | B2 | 5/2011 | Carter et al. | |
| 7,999,733 | B2 | 8/2011 | Gronemeyer | |
| 8,018,376 | B2 | 9/2011 | McClure et al. | |
| 8,046,160 | B2 | 10/2011 | Carter et al. | |
| 8,047,161 | B2 | 11/2011 | Moore | |
| 8,149,110 | B2 | 4/2012 | Troxler | |
| 8,238,489 | B2 | 8/2012 | Kim et al. | |
| 8,463,540 | B2 | 6/2013 | Hannah et al. | |
| 8,820,447 | B2 | 9/2014 | Carter et al. | |
| 9,116,234 | B2 | 8/2015 | Van Dierendonck et al. | |
| 9,164,176 | B2 | 10/2015 | Fenton | |
| 2001/0048387 | A1 * | 12/2001 | Sheynblat | G01S 5/0063 342/357.67 |
| 2002/0050944 | A1 * | 5/2002 | Sheynblat | G01C 21/206 342/357.25 |
| 2002/0196151 | A1 | 12/2002 | Troxler | |
| 2004/0102896 | A1 | 5/2004 | Thayer et al. | |
| 2004/0160365 | A1 * | 8/2004 | Riley | G01S 5/0278 342/451 |
| 2004/0166873 | A1 * | 8/2004 | Simic | G01S 5/0226 455/456.1 |
| 2005/0060069 | A1 | 3/2005 | Breed et al. | |
| 2005/0259240 | A1 | 11/2005 | Goren | |
| 2006/0082498 | A1 * | 4/2006 | Pitt | G01S 19/05 342/357.42 |
| 2006/0125694 | A1 * | 6/2006 | Dejanovic | C07D 263/58 342/463 |
| 2007/0058700 | A1 * | 3/2007 | Fenton | G01S 19/30 375/150 |
| 2009/0040103 | A1 * | 2/2009 | Chansarkar | G01S 19/37 342/357.74 |
| 2009/0322600 | A1 | 12/2009 | Whitehead et al. | |
| 2010/0161179 | A1 | 6/2010 | McClure et al. | |
| 2011/0211521 | A1 * | 9/2011 | Baba | H04B 7/155 370/315 |
| 2014/0232601 | A1 | 8/2014 | Ische et al. | |

OTHER PUBLICATIONS

M. Loy et al., ISM-Band and Short Range Device Regulatory Compliance Overview, Texas Instruments, May 2005.*
Ntia, 1626.5-1660 MHz, https://www.ntia.doc.gov/files/ntia/publications/compendium/1626.50-1660.00_01SEP14.pdf, Sep. 2013.*
Calais, E., The Global Positioning System, Presentation Slides, Apr. 2003, available at http://web.ics.purdue.edu/~ecalais/teaching/geodesy/GPS_observables.pdf.
Moeglein, M., et al., "An Introduction to SnapTrack Wireless-Assisted GPS Technology," in GPS Solutions, vol. 4, No. 3, Jan. 2001, pp. 16-26.
Ward, Phillip W., et al., "Chapter 5: Satellite Signal Acquisition, Tracking, and Data Demodulation," in Understanding GPS: Principles and Applications, Second Edition, E. Kaplan and C. Hegarty, Artech House, Mar. 2006, pp. 153-241.
Assisted GPS, Wikipedia, accessed Apr. 11, 2016.
NAVSTAR GPS User Equipment Introduction, Sep. 1996.
International Search Report and Written Opinion in corresponding International Application No. PCT/US2016/020755, dated Jun. 20, 2016, in 11 pages.

* cited by examiner

LOW-ENERGY CONSUMPTION LOCATION OF MOVABLE OBJECTS

CROSS-REFERENCE TO RELATED APPLICATIONS

This application claims the benefit of priority to U.S. Patent Application No. 62/129,278, filed Mar. 6, 2015, entitled "Systems and Methods for Location of Movable Objects," which is hereby incorporated by reference herein in its entirety.

BACKGROUND

Field

The disclosure generally relates to systems and methods for locating movable objects and more particularly to systems and methods that use a global navigation satellite system (GNSS) to provide location estimates while using low energy at the movable objects.

Description of Related Art

GNSS techniques can be used to determine a location for a movable object. The GNSS can include a constellation of Earth-orbiting satellites that each broadcast coded radio frequency (RF) signals. The constellation may include 27 or more satellites so that multiple satellites are in the sky (above the horizon) over nearly any particular region of the Earth at any time. A GNSS receiver can receive signals from multiple satellites that are visible to the receiver (e.g., above the receiver's horizon) and process the received signals to determine a location of the receiver relative to the Earth.

SUMMARY

Estimating a movable object's location using a GNSS can require significant energy consumption in a GNSS receiver at the movable object, because the GNSS receiver must acquire and process GNSS signals from multiple GNSS satellites. There is a need for systems and methods that can use a GNSS to provide a location or position estimate for a movable object while using low amounts of energy at the movable object in determining the location estimate. As used herein, location and position are generally used interchangeably, unless the context clearly indicates otherwise.

In one implementation, a mobile station attached to or included in a movable object can communicate bidirectionally with a fixed base station to determine a location of the movable object. The bidirectional communication may be over a radio frequency (RF) link that is in an RF band that is unlicensed by radiocommunication authorities (e.g., a non-cellular communication band). The mobile station may communicate an estimated position to the base station. The estimated position may be based on dead reckoning by the movable object or information from non-GNSS position sensors at the movable object. The mobile station can receive from the base station a set of GNSS satellites that are visible to the mobile station. The mobile station can acquire satellite timing information from GNSS signals from the set of satellites and communicate minimally-processed satellite timing information to the base station. The base station can determine the position of the mobile station and communicate the position back to the mobile station. By offloading much of the GNSS position processing to the fixed base station (which is typically powered by a mains electric power system), energy consumption of the mobile station (which may be powered by a battery) is reduced.

In various implementations, the low-energy consumption GNSS location systems may use pseudolites that transmit GNSS-like signals to the mobile stations on an unlicensed RF band that is close in frequency to a GNSS satellite transmission frequency. A GNSS receiver in the mobile station can receive signals at both the GNSS satellite transmission frequency and the pseudolite transmission frequency. In some such implementations, the pseudolite transmission frequency is in a range from 1626.5 MHz to 1645.5 MHz.

Embodiments of the low-energy GNSS location techniques described herein can be used in applications including, but not limited to, locating movable carts in a retail store environment (e.g., shopping carts), a warehouse environment (e.g., warehouse carts), a medical facility (e.g., medical equipment carts, hospital beds), or a transportation hub (e.g., baggage carts). Other applications include low-energy consumption location of other types of movable objects including locating or tracking humans or animals. In yet other applications, movable objects can include objects that can move under their own power (e.g., motorized carts, golf carts, mechanized equipment, off road vehicles, etc.) or objects that can be moved by another vehicle or mechanism (e.g., trailers, containers, pallets, heavy equipment, etc.).

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Figure 1:
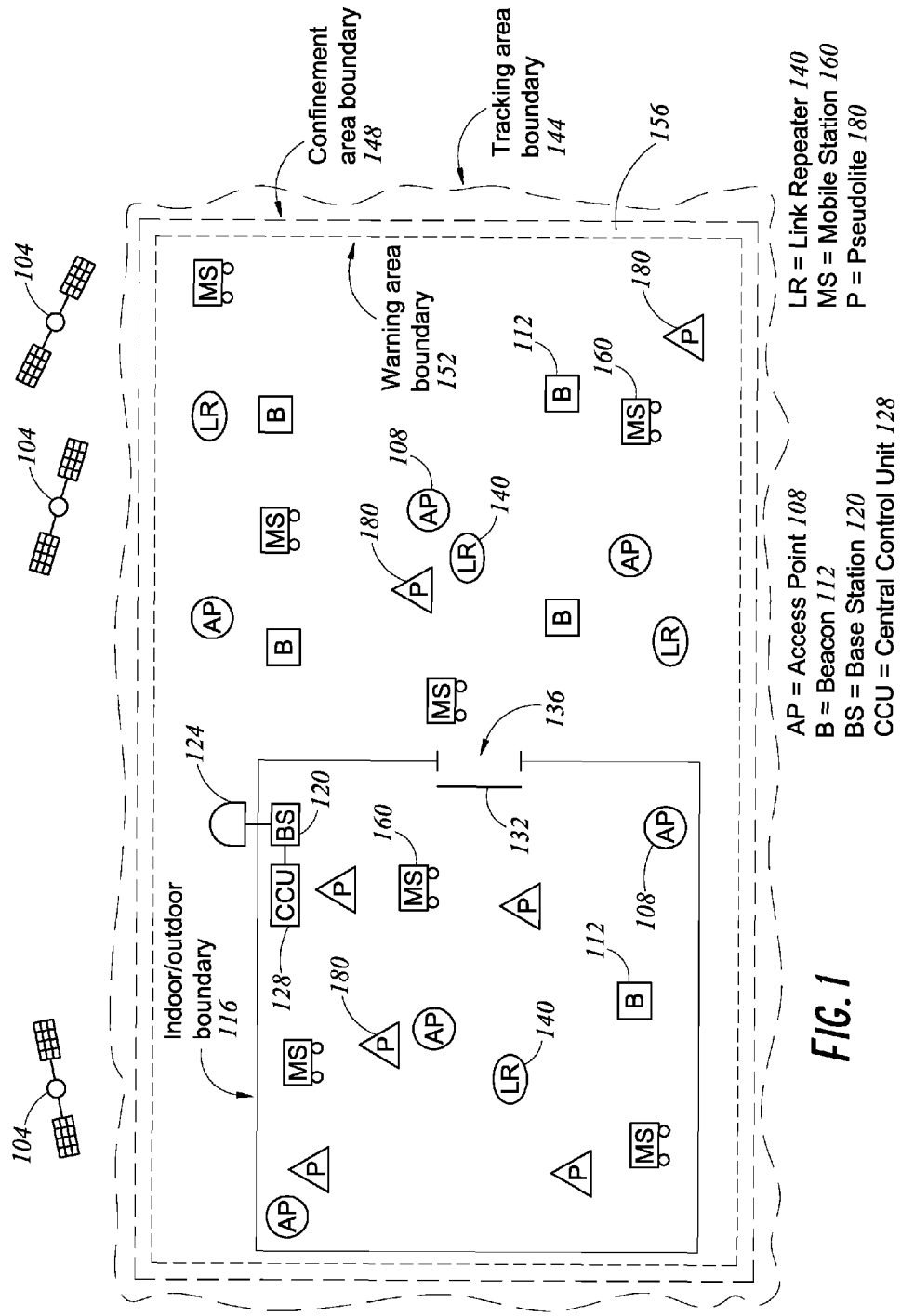
FIG. 1 illustrates an example system setup involving a low-energy GNSS mobile system.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview of Satellite Navigation

A global navigation satellite system (GNSS) includes a constellation of orbiting satellites that provide location information to GNSS receivers on the Earth. A GNSS receiver acquires and processes radio frequency (RF) signals from multiple GNSS satellites to determine a location of the receiver. For example, a satellite signal includes navigation data (e.g., an ephemeris (precise satellite orbital data), an almanac (satellite network data and ionospheric correction parameters), and satellite atomic clock data) that can be used to determine the position and velocity of the satellite relative to the Earth. The satellite signal also includes a code sequence that uniquely identifies the satellite. The information in the satellite signal is coded as a phase modulation of an RF carrier frequency. The frequency of the phase modulation is called the chip rate.

A GNSS receiver can measure a satellite signal and time-align a receiver-generated version and the receiver-measured version of the code sequence to identify the time of arrival (TOA) of a defined point in the code. The GNSS satellite clocks are synchronized. If the receiver clock is synchronized with the satellite clocks, then the TOA data acquired from three satellites visible to the receiver can be used to determine the three-dimensional position of the receiver. However, since GNSS receivers are not typically synchronized with the satellite clocks, a signal from a fourth satellite is used to determine a time offset between the receiver clock and the satellite clocks. The GNSS signals acquired from the four satellites can be converted into a position of the receiver in a geodetic system (e.g., longitude, latitude, and height). In practice, signals from more than four satellites visible to the receiver may be acquired to provide increased accuracy or error detection or correction. In practice, six to twelve satellites may be simultaneously visible at a particular location depending on the constellation geometry, the presence of nearby buildings, vehicles, structures, or topography (e.g., hills, location of the receiver in an actual or urban canyon), an elevation cut-off angle (e.g., only satellites above the cut-off angle are used), etc.

The systems and methods disclosed herein can be used with any type of GNSS including, for example, the NAVSTAR Global Positioning System (GPS), Russia's Global Navigation Satellite System (GLONASS), the European Union's Galileo positioning system, the Indian Regional Navigation Satellite System, China's BeiDou or COMPASS Navigation Satellite System, and so forth. In many of the example implementations described below, the systems and methods are described with reference to the GPS system, but this is for purpose of illustration and is not a limitation.

In GPS, each satellite continuously transmits navigation information at two carrier frequencies: L1 (at 1575.42 MHz) and L2 (at 1227.60 MHz). The navigation information is encoded using a pseudorandom noise (PRN) code and the carrier frequencies are modulated with the code. Multiple codes are used, including, a coarse acquisition (C/A) code, and a precision (P) code that can be encrypted (by modulating with an encryption (W) code) to provide an encrypted P(Y) code (which can be decrypted only with a classified decryption key). The C/A code is modulated onto only the L1 carrier frequency while the P(Y) code is modulated onto both the L1 and L2 carrier frequencies. The PRN codes are different for each satellite in the constellation so that a GPS receiver can determine from which satellite the navigation signal is received. The chip rate for the C/A code is 1.023 MHz, and the chip rate for the P code is 10.23 MHz.

A navigation message is also modulated onto the carrier frequencies (at much lower modulation frequencies than the C/A or P(Y) codes). The navigation message includes the satellite ephemeris (precise orbital data), atomic clock parameters, and the almanac (coarse orbit and status information for all the satellites in the constellation). The ephemeris for each satellite is updated every two hours and is generally valid for four hours, while the almanac is typically updated once a day.

Because all of the navigation information is modulated onto the same L1 carrier frequency, the signals must be separated (e.g., decoded) after demodulation by the receiver. If the almanac information has previously been acquired by the receiver, the receiver can choose the satellites to listen for (e.g., those that are visible to the receiver). If the almanac information is unknown to the receiver, the receiver can search until a lock is obtained on one of the satellites. To obtain a lock, there must be an unobstructed line of sight from the receiver to the satellite. The receiver can then acquire the almanac from the satellite and determine other satellites it should listen for (e.g., those above the horizon at that time at the receiver's location). As it detects each satellite's signal, the receiver can identify the satellite by its distinct C/A code pattern. The receiver can determine the TOA information needed for location determination by, for example, cross-correlating a receiver-generated replica of the C/A code with the C/A code in the received satellite signal. The TOA information from four satellites provides sufficient information to determine the location of the receiver.

Overview of an Example of Low Energy GNSS Location Technology

A possible disadvantage of many GNSS receivers is that a significant amount of electrical energy is needed to search for and acquire signals from the GNSS satellites, obtain the almanac, determine which satellites in the constellation to listen for, acquire multiple satellite signals, and process the acquired signals to determine the location of the receiver. For example, from a cold start (where the receiver clock has a large time offset and the most recent almanac received from a satellite has expired), the receiver may take some tens of minutes to acquire the visible satellites and obtain a good location estimate, which can take a substantial amount of energy. Maintaining the lock on the satellites will also use energy. For applications where the receiver is connected to an external power source (e.g., a 120-volt wall socket), such energy usage may not be problematic. However, for receivers powered by a small battery, such energy usage may rapidly deplete the battery and cause the receiver to power down after a relatively short time period (necessitating replacing or recharging the battery). In many commercial applications, it may be disadvantageous to have to periodically replace or recharge GNSS receiver batteries, for example, where the locations of many objects (each having a separate receiver) are being tracked. Accordingly, there is a need for satellite navigation systems and methods that provide locations of movable objects while reducing or minimizing energy consumption.

The following provides a high-level, illustrative description of an example low-energy GNSS location technology. In this example, a mobile station is attached to, on, or in a movable object. The mobile station can be battery powered. A fixed base station is located in a known, generally fixed, position and is generally powered by a non-battery source (e.g., 120-volt wall socket). The fixed base station can enable the mobile station to obtain a precision GNSS fix more quickly and at much lower average battery energy. The mobile station has at any given time a rough idea of its location (possibly through dead reckoning based on the mobile station's last known location, but possibly through some other location techniques such as measurement of a received signal strength indicator (RSSI) from an RF access point, optical recognition of optical position markers, etc.).

As the mobile station moves, the base station generally will be close enough to the mobile station that most of the time a reliable bidirectional RF link between the base and mobile stations can be created so that the mobile and base stations can exchange information. In other examples, an optical communication link (e.g., infrared) may be additionally or alternatively created.

The base station has an RF antenna, GNSS processing capability, etc. to keep track of all (or substantially all) of the GNSS satellites in view from the location of the mobile station. When the mobile station determines that it needs a precision GNSS fix, the mobile and base stations can perform the following actions in this example operation scenario.

1. The mobile station sends a message to the base station informing the base station of the mobile station's best guess or estimate of its present position.

2. The mobile station synchronizes its local clock to the base station clock, by receiving clock timing information from the base station. The base station's clock can be kept in synchronization with the GNSS time used by the GNSS satellites.

3. The base station calculates which GNSS satellites can provide the best fix (e.g., a precise location) for the mobile station, and when each of those satellite's broadcast will next be at a code boundary at the mobile station's location. The base station might also calculate some additional parameters to aid the mobile station's rapid acquisition of the satellites, e.g., Doppler correction for low azimuth satellites such as modified correlator coefficients for the receiver in the mobile station. The base station can use the coarse acquisition C/A code or the encrypted precise P(Y) code (for improved position accuracy without using carrier phase methods). The present state of the encryption (W) code for each selected satellite can be used in some implementations.

4. The base station then transmits the information calculated in the previous action to the mobile station. As an optional implementation optimization, there can be a clock update to improve the mobile station's estimate of its clock drift.

5. Using GNSS receiver baseband processing techniques, the mobile station uses the information from the previous action to run its GNSS receiver at the right window of time to capture the code phase transitions from the visible satellites.

6. The mobile station then sends the minimally processed measurements to the base station.

7. The base station performs the navigation equation processing and sends the mobile station an update of the mobile's true position. Since the base station is fixed, the mobile position is automatically differentially corrected relative to the base station. Thus, the low-energy GNSS location technology can have the benefit of automatically correcting atmospheric errors, a major source of errors in GNSS location accuracy.

By offloading much of the GNSS processing from the mobile station to the base station, energy usage by the mobile station is significantly reduced. The mobile station may wake up and acquire satellite data at just the right time (as determined by the base station), transmit the data to the base station (for further processing), and then go back to sleep after it receives its precision location from the base station. All of this also serves to reduce energy usage by the mobile station.

Example Pseudolites

There are existing devices known as pseudolites (for "pseudo-satellites") which transmit signals that mimic (to varying degrees) the GNSS signal structure, so that a suitably equipped GNSS receiver can maintain a position fix by receiving GNSS signals from a pseudolite when fewer than the minimum number of GNSS satellites are in view (including the case of no satellites in view). Pseudolites can be fixed in positions to create (at least in part) a ground-based positioning network. The GNSS receiver can be configured to receive signals from one or more pseudolites and/or one or more GNSS satellites to determine its position. One market for pseudolites is in mining, since GNSS RF signals cannot penetrate into the mine. Pseudolites can be placed in urban canyons, retail shopping centers, warehouses, indoor environments (where GNSS signals are blocked or weak), etc. to permit position determinations for objects in those spaces. In practice, pseudolites are almost always fixed in position.

Existing pseudolites transmit at frequencies widely separated from the GPS 1560 MHz to 1590 MHz (L1) and 1215 MHz to 1240 MHz (L2) RF carrier frequencies, for example, in the unlicensed 900 MHz to 928 MHz band. This usually requires that a pseudolite-compatible receiver contain a 900 MHz antenna and receiver analog front end in addition to the L1 (and/or L2) antenna and analog front end, which substantially increases the size and cost of a pseudolite-compatible receiver compared to an otherwise equivalent GPS receiver which did not have the pseudolite capability.

However, it is permissible in the U.S. (under Federal Communications Commission (FCC) guidelines) and in some other countries to operate an unlicensed transmitter in the frequency range 1626.5 MHz to 1645.5 MHz. This frequency range is close enough to the GPS L1 frequency that a single antenna and analog receiver operating across the entire frequency range (e.g., 1560 MHz to 1590 MHz and 1626.5 MHz to 1645.5 MHz) is feasible without sacrificing significant performance compared to an otherwise equivalent receiver design operating only over the GPS L1 frequency range. Accordingly, a pseudolite can broadcast signals (having a GNSS or GNSS-like signal structure) in the frequency range 1626.5 MHz to 1645.5 MHz to GNSS receivers operating in the 1560 MHz to 1590 MHz and 1626.5 MHz to 1645.5 MHz ranges that can pick up both orbiting GNSS satellite signals as well as terrestrial pseudolite signals. The receiver can use the satellite signals and/or the pseudolite signals to make a position determination, which advantageously permits the receiver to determine its position even if fewer (or none) of the required GNSS satellites are visible to the receiver.

The transmit power in 1626.5 MHz to 1645.5 MHz band allowed by the licensing authority (e.g., the FCC) is generally much less than permitted in the 900 MHz to 928 MHz band, so these 1626.5 MHz to 1645.5 MHz pseudolites typically may not have the range of 900 MHz to 928 MHz pseudolites. But for some applications the achievable range with 1626.5 MHz to 1645.5 MHz band is sufficient, and the cost and size reduction in the mobile station may be commercially advantageous. If a 1626.5 MHz to 1645.5 MHz pseudolite does not transmit continuously, it is permitted in the U.S. under 47 C.F.R. 15.209 to produce a field strength of 500 µV/m at a distance of 3 meters, or −41 dBm effective isotropic radiated power (EIRP) in a 1 MHz bandwidth. If the required pseudolite received power at the mobile station is −121 dBm, which corresponds to a very strong signal for a GNSS receiver, the free space range of the pseudolite is about (−41 dBm−(−121 dBm))/2=40 dB (3 meter) or 300 meters.

When combined with the low-energy GNSS system architecture described herein, it becomes possible for the 1626.5 MHz to 1645.5 MHz pseudolites to transmit when needed (e.g., under the control of the base station processing element, which knows when a mobile station will be listening for the pseudolite(s)), as compared to conventional pseudolites which typically are always transmitting. Various embodiments of this "only when needed" mode may have advantages such as: because of FCC regulations that apply to unlicensed transmitters in the 1626.5 MHz to 1645.5 MHz band, the pseudolite's transmit power and thus range can be increased if it is only intermittently operating (so that the pseudolite's average transmit power meets the regulations, even though the pseudolite's peak transmit power exceeds the regulations for a sufficiently short time period). For example, if the pseudolite is configured to transmit not more than once per ten seconds, then in the U.S. under 47 C.F.R. 15.231(e) the permissible field strength is increased to 12,500 μV/m at a distance of 3 meters, providing an increase in range of a factor of 25. In some such embodiments, the average power consumption of the pseudolites may be greatly reduced, making it easier for a pseudolite to be powered by solar, wind, or some other non-mains power source.

Example Applications for Low Energy GNSS Technology

The disclosed systems and methods for low energy GNSS location of movable objects can be used in numerous applications, particularly in any application where the mobile station has a limited energy source (e.g., a battery). Examples of applications include retail environments (e.g., tracking positions of shopping carts), warehouse environments (e.g., tracking warehouse carts, inventory collection robots, etc.), transportation hub environments (e.g., tracking luggage carts in an airport), medical facility environments (e.g., tracking medical carts or medical equipment), and so forth. The low-energy GNSS techniques can be used for object location applications where the location of any type of movable, tangible object is to be determined (e.g., by attaching a mobile station to the object). The movable object can be any type of movable inanimate object (e.g., a cart, valuables, inventory, a portable object, etc.) or movable animate object (e.g., a person, a pet, an animal, livestock, etc.).

By using one or more pseudolites that transmit in an unlicensed band (e.g., 1626.5 MHz to 1645.5 MHz) near the L1 frequency, the disclosed systems and methods may be able to provide precision fixes in indoor environments or in environments where orbiting satellites are frequently blocked from view.

Example Low-Energy GNSS Mobile System Setup

FIG. 1 illustrates an example system setup diagram involving a low-energy GNSS mobile system. The environment may include both indoor and outdoor spaces. Line 116 illustrates a boundary separating indoor from outdoor space. Reception of signals from a GNSS satellite useful to position estimation requires unobstructed line of sight between a GNSS receiver and the satellite. Thus, to determine the position of an indoor object may require information additional to what is contained in signals from GNSS satellites, which are typically blocked or weak indoors. As described herein, one or more pseudolites can be used in indoor spaces or where GNSS satellites are routinely blocked.

A base station (BS) 120 with a GNSS antenna 124 is installed as a part of the setup, typically with the base station located indoors to protect it from weather elements. An indoor installation can also provide convenient access to an energy source, for example a 120-V main-power electrical outlet. Thus, energy consumption of a base station is generally not a constraint on the system. A GNSS antenna 124 is typically installed at a location with good line-of-sight visibility to a plurality of GNSS satellites 104 in a GNSS constellation orbiting the Earth. For example, installation of the base station and its GNSS antenna generally positions the antenna such that the antenna has unobstructed lines of sight to all or almost all (e.g., four or more) GNSS satellites above the horizon. A central control unit (CCU) 128 may be operably connected to the base station 120 and can provide processing, data storage, and network access services.

A low-energy GNSS mobile system has one or more mobile stations 160, which are movable or configured to be attached to or included in or on a movable object. As described herein, the mobile stations 160 can be provided in wheels for human-propelled movable carts (e.g., shopping carts) or in other parts of the carts (e.g., frame or handlebar), in or on inventory to be tracked, attached to persons or animals, etc. Tracking the positions of the mobile stations or of the objects to which the mobile stations are attached is a main functionality of the GNSS mobile system. A mobile station 160 includes a GNSS receiver to receive GNSS signals. Such GNSS signals may be emitted by a GNSS satellite 104 or by a pseudolite 180. A mobile station also includes a radio link for two-way communication with the base station. A mobile station may also include other devices or components associated with position estimation. For example, a wireless transceiver can be used to establish communication with a wireless access point 108. The position of a mobile station may be estimated through such communication (e.g., via Received Signal Strength Indicator (RSSI) measurements). One or more electrical, electromagnetic, magnetic, or optical sensors can provide positional information from signals emitted from one or more beacons 112. For example, the mobile station 160 may implement a dead reckoning procedure to estimate its position. In contrast to a base station, a mobile station typically has a limited energy source, e.g., a battery (replaceable or rechargeable).

As described above, estimating position using GNSS satellite signals requires unobstructed line of sight from at least three or four GNSS satellites to a GNSS receiver. This requirement poses a challenge for indoor GNSS receivers. As will be described in connection with FIG. 8 below, one or more pseudolites 180 can provide GNSS signals (or GNSS-like signals) for position estimation. Thus, pseudolites are typically located indoors. Pseudolites are also useful outdoors, for example, in urban environments where high rise buildings, passing vehicles, and so forth can block line of sight to GNSS satellites.

An optional network connection to a base station can provide information beneficial to the low-energy GNSS mobile system. For example, the base station 160 may obtain more frequent or timely updates to timing data for individual GNSS satellites through the network. More up-to-date timing data allows the base station to synchronize its clock to a satellite clock with better accuracy. A network connection allows a base station to obtain information on weather conditions, updated ionospheric models, GNSS ephemerides, or almanacs. A base station can use such information to provide better data to a mobile station in aid of the mobile station's position estimation. A network connection may be used to provide remote control and/or monitor functionalities. For example, a remote server may connect to a plurality of base stations via the network to monitor the status of the base stations and/or of the associated mobile stations, to perform data aggregation, data mining, or other data analysis of the mobile station position information. The CCU 128 may connect to the base station 160 via the network. In some implementations, the functionality of the CCU is included in the base station, or vice-versa.

Example Tracking or Containment Applications

In FIG. 1, opening 136 illustrates a space through which objects can move from the indoor space to the outdoor space, or vice versa. An indoor/outdoor boundary may contain any number of openings. An entrance/exit of a building is an example of an opening 136. Line 132 illustrates an exit field from which movements of mobile stations through the opening 136 can be detected. The exit field may be created through, for example, access points 108 or beacons 112 positioned near the opening 136, a very-low frequency (VLF) signal line (e.g., a signal with a frequency in the unlicensed RF band below about 9 kHz), an Electronic Article Surveillance (EAS) system, a radio frequency identification (RFID) system, an ultrasonic transmitter, or the like. The exit field may be in the shape of a line, the shape of an antenna reception pattern, or some other shape. The mobile stations 160 can include sensors that sense the exit field and in response to the sensing, take an appropriate action. For example, a mobile station that senses the exit field 132 can determine that its current position is at the opening 136. The mobile station may use that position information to update or reset a dead reckoning system by which the mobile station estimates its position.

In the illustration of FIG. 1, the area within which tracking of mobile stations is desired is enclosed by a tracking area boundary 144. Because the tracking area may extend beyond the range of communication between a base station and a mobile station, one or more link repeaters 140 can be used to relay messages between a base station and a mobile station. Link repeaters will be further described below in connection with FIG. 7B.

In some applications and as illustrated in FIG. 1, the movable objects may be located or tracked in a confinement area enclosed by a confinement boundary 148, a free-roaming area within a warning area boundary 152, and a warning area 156 between the warning area boundary 152 and the confinement area boundary 148. A movable object may be permitted to move freely within the free-roaming area but may be warned that it is approaching the confinement area boundary 148 if the object moves within the warning area. Different corrective actions may be taken depending on where the object is located (e.g., no actions within the free-roaming area, a warning in the warning area, and a confinement action if the object passes the confinement boundary (on the way out)). Additional or different actions may be taken if the movable object moves from outside-to-inside the confinement area (e.g., the object is returning to the free-roaming area).

For example, in a retail store application, the indoor area may represent a store. Mobile stations may be mounted in or on shopping carts. The free-roaming area may include the store and the parking lot associated with the store. Shopping carts may move freely within the free-roaming area. The confinement area boundary 148 may include a perimeter at the outside of the parking lot. Shopping carts may be prevented from leaving the confinement area, e.g. by a braking mechanism that inhibits movement of the cart (e.g., by locking or inhibiting rotation of a cart wheel) after a cart leaves the confinement area. A warning area can represent the area between the free-roaming area and the confinement area. Shopping carts can provide a warning (e.g., an audio or visual signal) upon entry into the warning area to warn the person pushing the shopping cart that the cart is approaching a location where the cart will be stopped. As another example, in a livestock tracking application, an electronic device (included with or separate from a mobile station) may be attached to animals to be tracked or confined. As an animal roams into the warning area, the device may emit a sound to alert the animal. As an animal roams beyond the confinement area, the device may administer a mild stimulus to train the animal not to exit the confinement area. The boundary of the confinement (or warning) area can be different for different movable objects that move around the tracking area. The boundary of the confinement (or warning) area can be dynamic and based, for example, on factors or behaviors of the movable object (e.g., sick animals might be contained in a different area than healthy animals). In some implementations, the base station determines (or receives) updates to a confinement (or warning) boundary and communicates the update to the appropriate mobile station (or mobile stations) over the RF link.

Example Low-Energy GNSS Mobile System Implementation

Figure 2A:
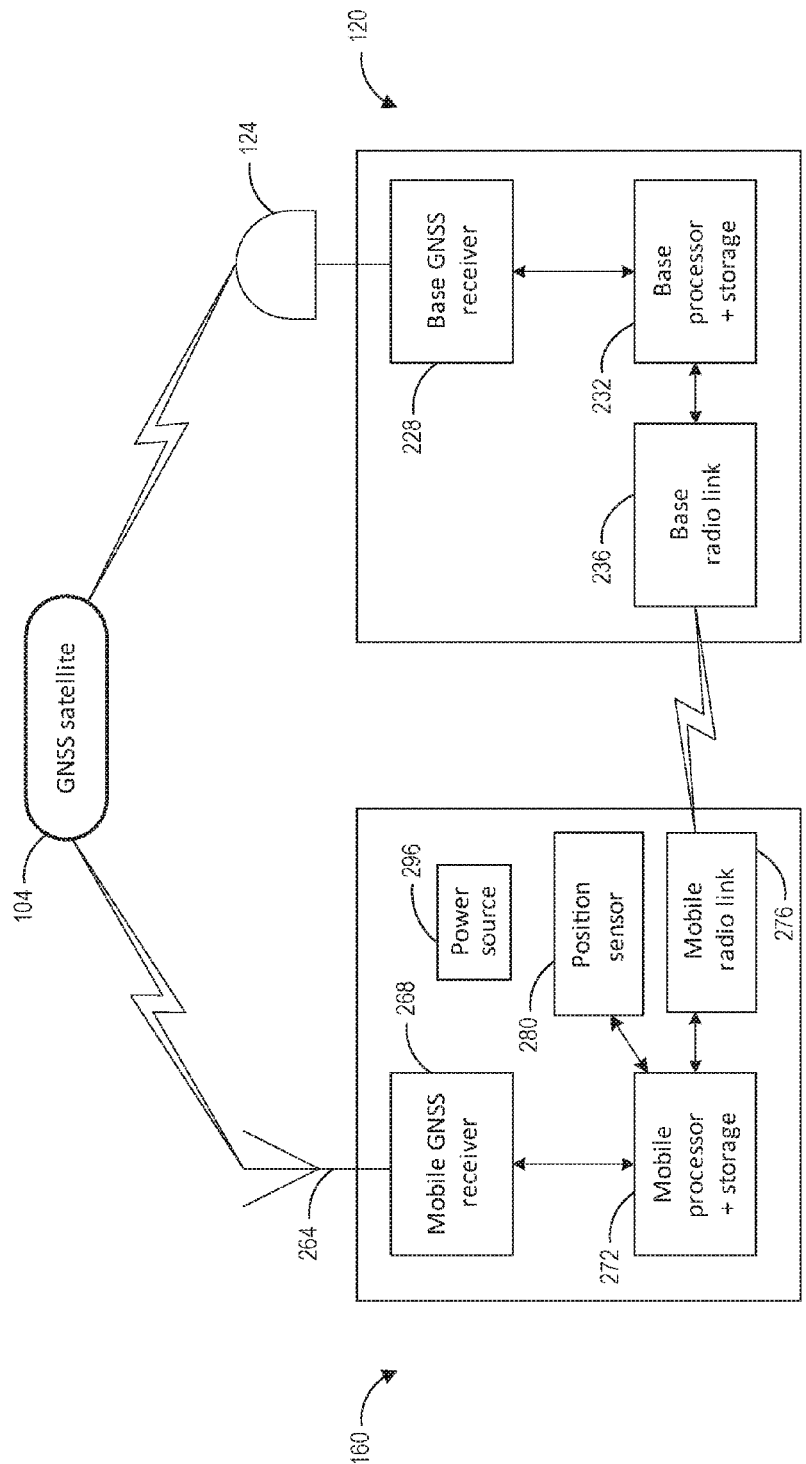
FIGS. 2A and 2B illustrate example implementations of a low-energy GNSS mobile system.

FIG. 2A illustrates an example implementation of a low-energy GNSS mobile system. One GNSS satellite 104, one base station 120, and one mobile station 160 are shown for the purpose of illustration, however, this is not a limitation. The GNSS satellite broadcasts its GNSS data. Both the base station and the mobile station can receive the GNSS satellite broadcast signals through their respective antennas 124 and 264. Both the base station and the mobile station also contain a radio link (shown as RF transceivers 236 and 276 for the base and the mobile station, respectively) to communicate with each other. To reduce energy consumption at a mobile station, a mobile station may transmit at a lower power level on the radio link than a base station. The base station may transmit a ready signal periodically to indicate its availability. The base-mobile radio link can use an unlicensed RF band (e.g., a band in which transmission does not require a license from a radiocommunications regulating agency) such as, e.g., 900 MHz to 928 MHz, 2.400 GHz to 2.483 GHz, or 5.8 GHz (e.g., a band from 5.725 GHz to 5.875 GHz) in the United States. An unlicensed RF band can include a band in the industrial, scientific and medical (ISM) RF bands (e.g., a Type B band) or a non-cellular RF band (e.g., a band outside of those licensed for RF cellular communications). Unlicensed ISM bands can include (in various countries or regions) bands below 1 GHz such as, e.g., 315 MHz to 316 MHz, 426 MHz to 430 MHz, 430 MHz to 432 MHz, 433.05 MHz to 434.79 MHz, 779 MHz to 787 MHz, 769 MHz to 935 MHz, and 863 MHz to 870 MHz.

In addition to an antenna 124, the illustrated base station 120 contains a GNSS receiver 228, a processor and data storage unit 232, and the radio link 236. The GNSS receiver receives electromagnetic signals from the GNSS satellite and converts information embedded in or associated with the signals to digital data formats for processing and storage by the processor and data storage unit. The processor computes various data to supply the mobile station. Such data is useful to assist the mobile station to estimate its position using GNSS signals with a low energy consumption (which preserves battery life). The processor generates messages for communication to the mobile station through the radio link. The processor also processes messages received from the mobile station or the CCU 128. The base station 120 can be powered by a mains power source.

The illustrated mobile station 160 contains an antenna 264, a GNSS receiver 268, a processor and data storage unit 272, a radio link 276, a power source 296, and a position sensor 280. The mobile station receives GNSS signals through the antenna 264. The GNSS receiver receives electromagnetic signals from the GNSS satellite and converts information embedded in or associated with the signals to digital data formats suitable for processing and storage by the processor and data storage unit. The processor computes various data to supply the base station. Such data is useful to the base station in estimating position of the mobile station. The processor generates messages for communication to the base station through the radio link. The processor also processes messages received from the base station.

The position sensor 280 can provide a non-GNSS position estimate, e.g., a position sensor that makes measurements that do not include measurements of GNSS satellite signals. One or more non-GNSS sensors (e.g., accelerometers, magnetometers, inertial measurement units (IMUs), gyroscopes, magnetic heading sensors, compasses, wheel rotation sensors, pedometers, gait sensors, optical sensors, VLF sensors, EAS sensors, RFID sensors, RF sensors, ultrasonic sensors, etc.) can be included in the mobile station and used by the position sensor at least partly to estimate position (e.g., via a dead reckoning algorithm). In some cases, the position sensor 280 may be able to determine position directly from a measurement (e.g., a VLF sensor that senses a VLF buried wire at a particular location), while in other cases, the position sensor may use other components or other sensors to make a position determination (e.g., a pedometer used with a compass and a dead reckoning algorithm). A pedometer or a gait sensor can include an accelerometer or IMU. For example, the position sensor 280 can be a dead reckoning sensor that comprises a magnetic sensor (e.g., a compass) to provide a heading of the mobile station. The dead reckoning sensor can also comprise a wheel rotation sensor to provide an estimate of distance traveled for a mobile station attached to an object with wheels. The combination of the magnetic heading and the distance estimate can be used in a dead-reckoning algorithm to provide a position estimate for the mobile station. A sensor that measures received signal strength indicator (RSSI) can provide an estimate of distance between the mobile station and a wireless access point 108. An optical or RF sensor can provide a position estimate based on the signals emitted by one or more optical, ultrasonic, or RF beacons 112 positioned throughout, or at certain locations within, the tracking area 144. For example, an ultrasonic sensor or RF sensor can measure a time of flight from a signal received from an ultrasonic beacon or RF beacon, respectively, which can be converted into a distance from the beacon based on the speed of sound or light, respectively. Multiple beacons can be used to triangulate the non-GNSS position of the mobile station.

As an example of such a non-GNSS sensor, if a mobile station is constrained (for whatever reason) to pass through a portal at a known location (e.g., the opening 136 shown in FIG. 1), an RF sensor on the mobile station can detect short-range signals from an RF transmitter or beacon mounted on or near the opening 136. The RF signal can contain the location of the opening, providing a good position estimate to the mobile station (e.g., for resetting a dead reckoning position estimate). The RF sensor can be configured for Near Field Communications (NFC), Bluetooth, Bluetooth low energy (BLE), IEEE 802.15, or any other type of wireless network protocol.

The power source 296 of the mobile station 160 can include a battery (e.g., replaceable or rechargeable), a capacitor (e.g., a high energy density capacitor such as an ultracapacitor or a supercapacitor), or any other non-mains energy source suitable for use with movable objects. Combinations of the foregoing can be used. Such power sources 296 typically have a finite energy reserve (e.g., the amount of battery capacity). As discussed, a disadvantage of many conventional GNSS receivers is their relatively high power requirements, leading to relatively short lifetimes for the power source 296. Embodiments of the low-energy GNSS systems described herein can reduce power consumption in the mobile station, leading to substantially longer lifetimes for the power source 296.

Figure 2B:
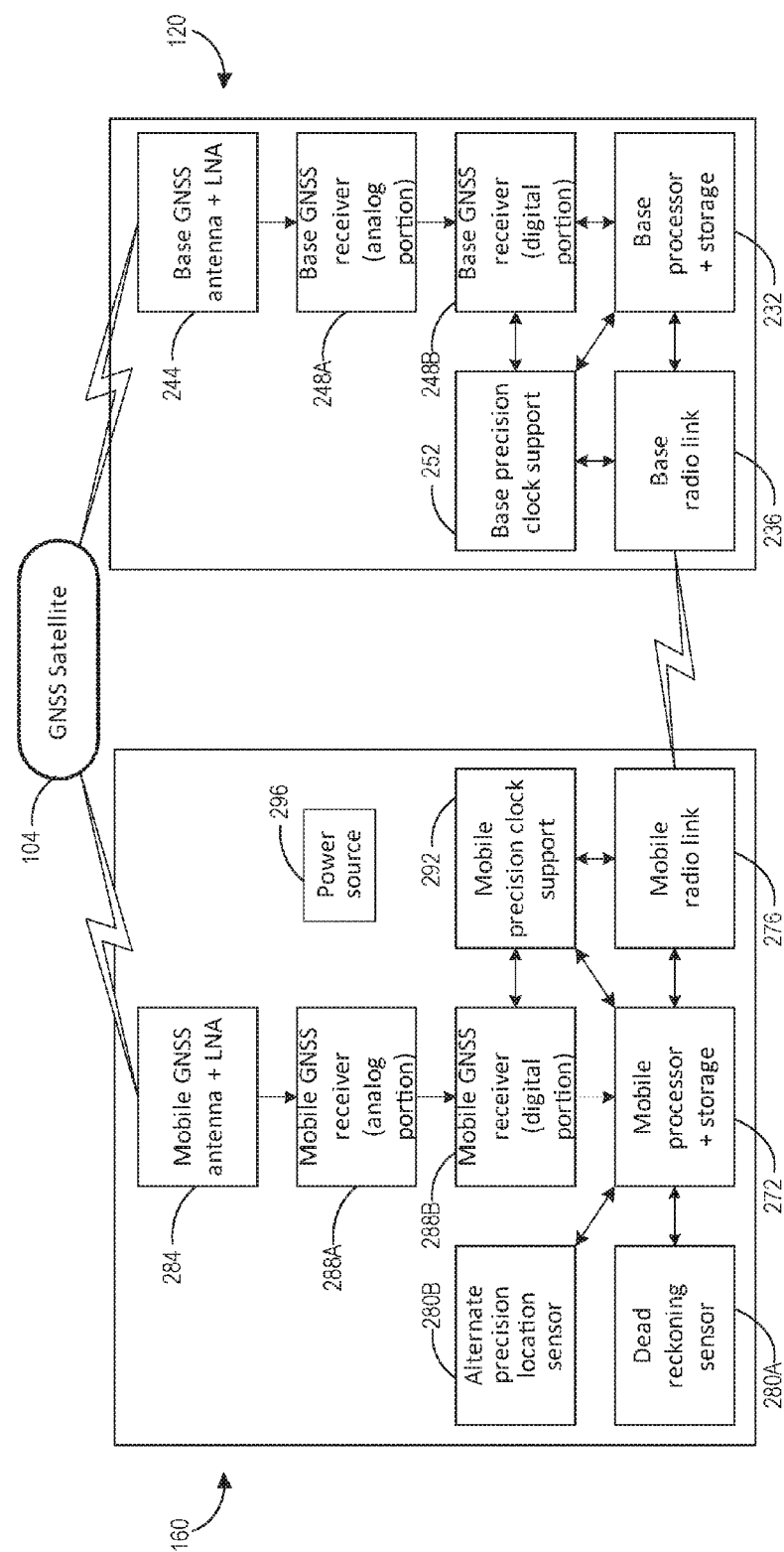

FIG. 2B illustrates another example implementation of a low-energy GNSS mobile system. One GNSS satellite 104, one base station 120, and one mobile station 160 are shown for the purpose of illustration, not by way of limitation. The GNSS satellite broadcasts its GNSS data. Both the base station and the mobile station can receive the GNSS satellite broadcast signals through their respective antennas and low noise amplifier (LNA) unit 244 and 284. Both the base station and the mobile station also contain a radio link (shown as the transceivers 236 and 276 for the base and the mobile station, respectively) to communicate with each other.

In addition to the antennas and LNA unit 244, the illustrated base station 120 contains a GNSS receiver partitioned into an analog portion 248A and a digital portion 248B, a processor and data storage unit 232, a radio link 236, and a precision clock support component 252. The LNA can amplify a low-power GNSS signal with only slight degradation to the signal-to-noise ratio (SNR). The precision clock support component provides functionalities to synchronize the base station clock to a GNSS satellite clock as well as to assist in synchronizing the mobile station clock to the base station clock. Because the base station is (typically) not energy constrained, it can receive GNSS satellite signals continuously and keep its clock synchronized with a GNSS satellite clock. The energy-constrained mobile station can synchronize its clock to the base station clock on an as-needed basis. Through the two pairwise synchronization of clocks, the mobile station clock can be synchronized (indirectly) to a GNSS satellite clock, enabling the mobile station to acquire signals from a GNSS satellite with lower energy consumption than when the clocks are not synchronized.

The illustrated mobile station 160 contains an antennas and LNA unit 284, a GNSS receiver partitioned into an analog portion 288A and a digital portion 288B, a processor and data storage unit 272, a radio link 276, a dead reckoning sensor 280A, an alternate precision location sensor 280B, and a precision clock support component 292. The mobile station receives GNSS signals through the antennas and LNA unit 284.

The GNSS receiver receives electromagnetic signals from the GNSS satellite and converts information embedded in or associated with the signals to digital data formats for processing and storage by the processor and data storage unit. The analog GNSS signals are typically sampled and digitized by an analog-to-digital converter (ADC) at the interface between the analog portion and the digital portion of the receiver. A benefit of a low-power GNSS receiver system in an implementation according to the present disclosure is reduction in the processing required by the digital portion of the GNSS receiver and the resulting reduction in power consumption. For example (and as further described herein), with timing data on code boundaries in GNSS signals received from a base station, a mobile station can start sampling at or near a code boundary and sample a shorter block of the GNSS signals than a mobile station would if the start of sampling has no relation to the code boundary. As a result, circuits in the digital portion 288B, such as digital-signal processing (DSP) filters and correlators, can be smaller and more power-efficient than in a conventional GNSS receiver.

A position sensor can provide a non-GNSS position estimate. For illustration, a dead reckoning sensor 280A is partitioned from an alternate precision location sensor 280B. A dead reckoning sensor may be an inertial system including a combination of a magnetic sensor, a rotation sensor or gyroscope, an accelerometer, and a microcontroller to convert the direction and distance data into positional data. Alternate precision location sensors may include other positional sensors, including those described above in connection with FIG. 2A. In some implementations, an inertial system may be reset and have its accumulated error cleared through adopting an estimated position by a non-GNSS sensor (e.g. an RF sensor for detecting short-range signals from a transmitter at a portal at a known location) or from the GNSS system as a new initial position. Accordingly, position drift errors in a dead reckoning estimate can be reduced so that the mobile station 160 continually has a reasonably accurate estimate of its position.

In some implementations, the two-way (bi-directional) communication between the mobile station and the base station can use the communication protocols described in U.S. Pat. No. 8,463,540, "Two-Way Communication System for Tracking Locations and Statuses of Wheeled Vehicles," which is hereby incorporated by reference herein in its entirety. In some implementations, the bi-directional communication between the mobile station and the base station can be in an unlicensed band, e.g., 900 MHz to 928 MHz, 2.4 GHz to 2.483 GHz, or 5.850 GHz to 5.925 GHz in the United States. In some implementations, the mobile station can implement the navigation technology (e.g., dead reckoning) described in U.S. Pat. No. 8,046,160, "Navigation Systems and Methods for Wheeled Objects," which is hereby incorporated by reference herein in its entirety. The two-way communication protocols and the dead reckoning technology described in these patents may be particularly advantageous for low-energy GNSS system embodiments where the mobile station is attached to or included in a human-propelled wheeled cart (e.g., in the frame or a wheel of a shopping cart). The mobile stations of some such wheeled cart embodiments may utilize a power source that includes a wheel power-generator such as described in U.S. Pat. No. 8,820,447, "Power Generation Systems and Methods for Wheeled Objects," which is hereby incorporated by reference herein in its entirety.

Example Low-Energy GNSS Mobile System Processing and Communication Flow

Figure 3:
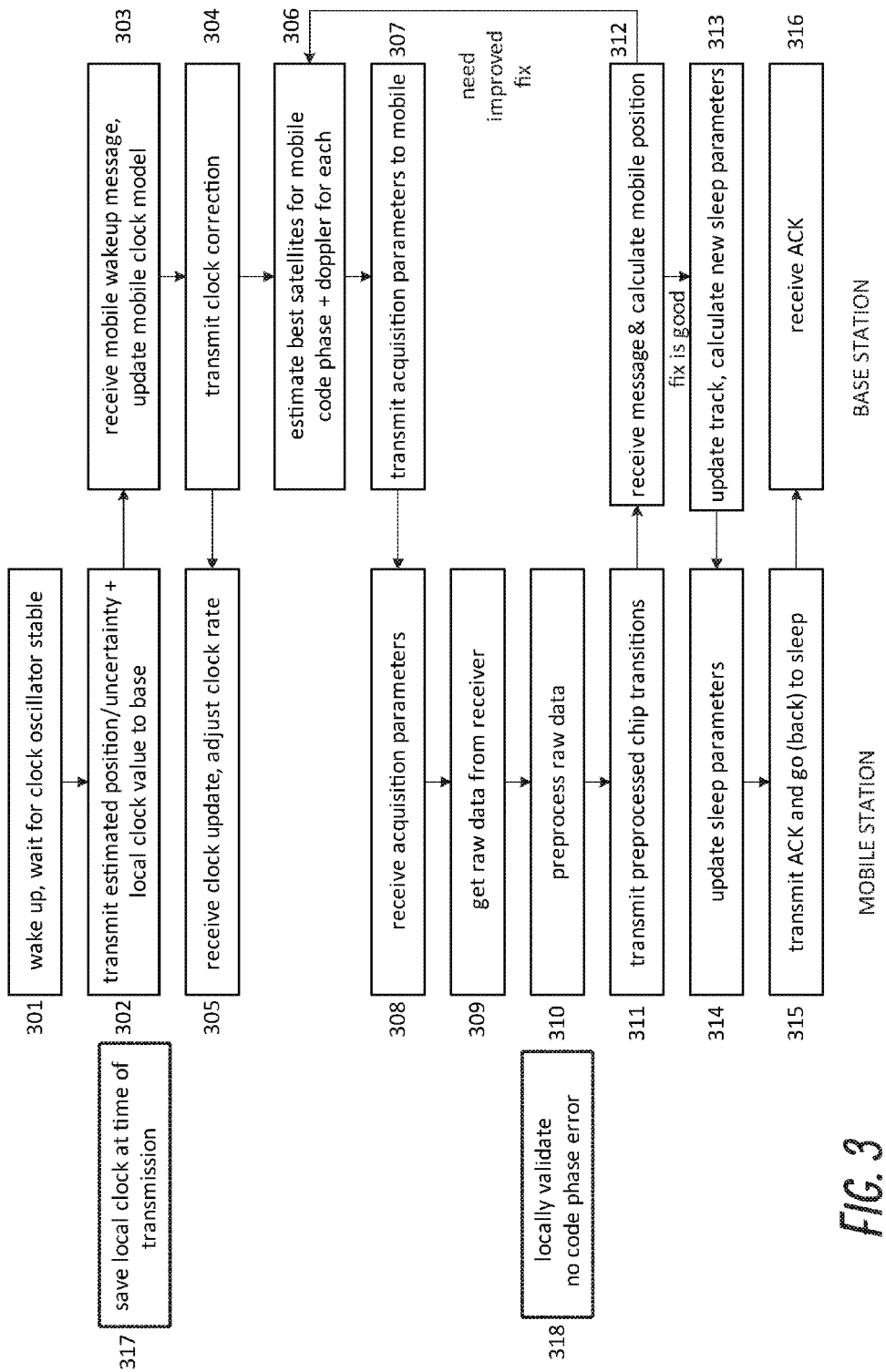
FIG. 3 illustrates example processing and communication functions performed in a low-energy GNSS mobile system.

FIG. 3 illustrates example processing and communication functions performed by a mobile station and by a base station in an implementation of a low-energy GNSS mobile system. The functions performed by a mobile station appear in blocks on the left. The functions performed by a base station appear in blocks on the right.

At block 301, the mobile station wakes up at a time specified in its sleep parameters, or when a condition specified in its sleep parameters is met. The sleep parameters can be stored in the storage 272. A clock oscillator in the mobile station may require a warm-up time to stabilize. Thus the mobile station may monitor an attribute of the oscillator, for example short-term frequency drift, to determine whether the oscillator is stable to within a predetermined range. At block 302, the mobile station estimates its current position. This estimate may be based upon outputs from a dead reckoning sensor and/or another non-GNSS location sensor as described in connection with FIGS. 2A and 2B. This estimate may include the current estimated position of the mobile station and optionally an uncertainty measure associated with the estimated position. The position and uncertainty estimates may be expressed as a range of positions, for instance. Where the position estimate based on a non-GNSS sensor is not dependent on the stability of the clock oscillator, the estimate may be performed during the warm-up period of the oscillator. After the clock oscillator becomes stable, the mobile station transmits its position estimate and its local clock value to the base station via the radio link 276. The local clock value can be captured at a fixed time relative to the start of transmission and is saved to a local memory of the mobile station, as indicated by block 317. Clock synchronization is described further below in connection with FIGS. 7A and 7B.

At block 303, the base station receives the message from the mobile station via the radio link 236. The base station updates its model of the mobile station clock based on, at least in part, the local clock value in the message from the mobile station. The base station computes a clock correction value for the mobile station and transmits the value to the mobile station, as shown at block 304. At block 306, the base station estimates which GNSS satellites are most likely in view from the mobile station. This estimate can be based at least in part on the estimated current position of the mobile station contained in the message from the mobile station.

This estimate for the viewable satellites can include additional considerations such as reducing or minimizing a dilution of precision (DOP, such as, e.g., a geometric dilution of precision (GDOP)), for example, in a direction of interest. The base station also computes code phases and optionally Doppler shift associated with each satellite to be included in information sent to the mobile station. This information (e.g., satellite acquisition information), transmitted from the base station to the mobile station at block 307, includes at least a set of satellites whose signals the mobile station can attempt to acquire and code phases on C/A and/or W codes associated with each satellite (e.g., the moments in time when broadcast of each satellite in the set will next be at a code boundary at the mobile station's location). The set of satellites can be provided as a list of the viewable satellites and in some cases, as a ranked list, in which more desirable satellites (for precise position estimation) are ranked higher than less desirable satellites. Ranking will be further described below.

Although position can be determined based on signals from as few as four GNSS satellites (assuming the mobile clock is not synchronized to the satellite clocks) and as few as three GNSS satellites (assuming the mobile clock is sufficiently synchronized to the satellite clocks), the set can include more than three or four satellites to provide alternatives in case not all of the minimum number of satellites are visible from the mobile station or produce signals with high received SNR at the mobile station. The information may also contain Doppler shift associated with each satellite in the set. For mobile stations moving at speeds much less than the speed of GNSS satellites, Doppler shift is basically independent of the individual mobile station. Rather, Doppler shift depends on the individual satellite location and is greater for satellites near the horizon. The information sent to the mobile station may additionally contain initialization parameters for the mobile station GNSS receiver, e.g., parameters for frequency lock loop or phase lock loop (PLL).

Satellites in the set may be ranked according to one or more ranking criteria. For example, satellite signals in close alignment along the direction of movement of the mobile station may provide better resolution for position estimates. Thus, for mobile stations moving on a flat terrain, satellites near the horizon may provide signals with better resolution for ground position estimates. However, signals from satellites near the horizon travel through a longer ionospheric path to reach the mobile station and are potentially subject to greater errors than signals from high-altitude satellites. Signals from satellites near the horizon also tend to have greater Doppler shift. As a result, ranking the satellites involves balancing counteracting factors such as those discussed above. The ranking may also depend on availability of additional information such as an updated ionospheric model.

Satellite acquisition information from the base station may further include selection information useful to the mobile station in determining which of the GNSS satellites in the set from which to acquire GNSS signals. The selection information may include an order of satellites to acquire, where the order may be based on a contingency. For example, if the contingency does not occur, a first order of acquisition is used, whereas if the contingency occurs, a second order of acquisition is used. As an example, such selection information can include positional proximity of two satellites such that if the mobile station fails to acquire a good-quality signal from one satellite, the mobile station can skip acquisition of signals from the other satellite. To illustrate, satellite #4 and #5 in the set may both be located near a hill from the perspective of the mobile station such that if the mobile station cannot acquire a good-quality signal from satellite #4, the mobile station should skip acquisition of signals from satellite #5, as the signals are likely also blocked by the hill. As another example, satellite positional information may be used to designate a primary and a backup satellite both in a direction of interest. If the mobile station cannot acquire a good signal from the primary satellite, the mobile station can attempt to acquire a signal from the corresponding backup satellite. As an illustration, assume that satellite #3 is located in the direction of movement of the mobile station. Satellite #7 is located in the opposite direction, 180° from satellite #3. Signals from both satellites can potentially provide good resolution in position estimate in the direction of movement. Thus, if the mobile station cannot acquire a good signal from satellite #3, it may be better off acquiring signals from satellite #7 than from satellites #5 and #6 in the set, whose signals the mobile station would normally attempt to acquire before satellite #7 because of their higher ranks. Descriptions of a direction of interest and additional example factors for ranking the satellites are discussed below in connection with FIGS. 6A and 6B.

At block 305, the mobile station receives clock correction information from the base station. The mobile station then applies correction to its clock, for example by adjusting a PLL to adjust the mobile station's clock rate. After clock correction, the clock of the mobile station is synchronized to the clock of the base station. Because the clock of the base station can be and presumably is synchronized to a GNSS satellite clock, the mobile station clock is also synchronized to the GNSS satellite clock after the clock correction.

At block 308, the mobile station receives the set of satellites and associated acquisition information from the base station. Using this information from the base station, the mobile station can acquire GNSS signals. With a clock synchronized to a GNSS satellite clock and with code phase timing information supplied by the base station, a mobile station can start acquiring GNSS satellite signals at precise times, for example at or near a code phase transition. Thus, instead of acquiring large blocks of GNSS signals potentially multiple times in search for a code phase transition, a mobile station can initiate acquisition at the right time and capture only a small block of signal, saving significant amounts of energy. For example, a 10-µs-long signal block (e.g., 2,000 digital samples sampled at 200 MHz) may be sufficient. In other cases, the mobile station may search for GNSS signals for a time period in a range from less than 1 µs, 1 µs to 100 µs, 100 µs to 1000 µs, or longer.

At block 309, digitized baseband raw data is transferred from the GNSS receiver to the processor 272. Depending on the implementation of the analog portion of the receiver, the raw data may be in-phase (I) only or both in-phase and quadrature (Q).

At block 310, the processor preprocesses the digitized baseband raw data, primarily to obtain chip transition times to send to the base station at block 311. To estimate chip transition times from GNSS signals, the mobile station can despread the acquired signal starting from the code used by the first satellite in the ranked list, proceed down the list, and stop after obtaining good-quality signals from the minimum number of satellites needed for position. As explained above, the minimum number of satellites is three or four, depending on whether the mobile station's clock is synchronized to the satellite clocks. The reference spreading code associated with each satellite is stored in the mobile station, for example in data storage 272. The despread signal, e.g., the output of a correlator, contains attributes indicating the quality of the corresponding received signal, e.g., power, width (e.g., 3-dB) of the peak in correlator output, and SNR. A mobile station can compute such quality indicators with low energy consumption.

A determination of the quality of the received signal may be based in part on one or more attributes associated with the despread signal. The criteria for a good-quality signal may depend on many factors, such as performance of the mobile station's GNSS receiver, availability of external aiding information (e.g., up-to-date ionospheric models), desired or required level of precision for the position estimates, sources and nature of GNSS signal distortion (e.g., wideband versus narrow-band interference), etc. A signal quality considered good for an embodiment in a certain operating scenario under certain conditions may not be good enough for another embodiment in a different operating scenario under different conditions. Thus, the following examples of good-quality signals are not limiting.

For example, a 3-dB width of the of the peak in correlator output can be considered good if it is a fraction of a chip time, e.g. ¼, ½, ¾ of a chip time. Half of a chip time at the 10.23 MHz P(Y) code rate, for instance, translates to less than 49 nanoseconds. A different fraction (e.g., ¾) at a different chip rate translates to a different width. As another example, a conventional GNSS receiver in acquisition mode (e.g., acquiring GNSS satellite signals from a cold start) may require higher received signal power (e.g. 4 to 16 dB higher) than the receiver in tracking mode. For instance, a nominal GPS power on the L1 C/A code as received at the Earth's surface at 5 degrees above horizon is about −129 dBm at the input to the LNA (assuming an isotropic antenna and average non-rainy weather). A nominal GPS power on P(Y) code received under the same condition is about 3 dB lower, −132 dBm. A specified performance level (e.g., a minimum level at or above which signal quality can be considered good) of received signal strength measured at the LNA input for a conventional GPS L1 receiver in acquisition and tracking modes may be −150±3 dBm and −160±3 dBm, respectively, to leave margin for degraded conditions such as high levels of moisture in the atmosphere. One or more of the factors described above may change these specified performance levels. Embodiments of the mobile station GNSS receivers, when not operating in an autonomous mode, may function similarly to a conventional GNSS receiver in tracking mode. However, some applications may impose design goals on embodiments of GNSS receivers. For example, some of the retail store shopping cart and livestock tracking applications described herein may not permit a good antenna design (e.g., isotropic), with e.g., zero dBic gain near the horizon on mobile stations. A base station not subject to significant constraints on factors such as size, shape, and weight can be designed with a good non-moving antenna. However, for a mobile station antenna that may need to be placed, e.g., in a shopping cart handle or in a collar placed around the neck of an animal, compromises in performance may be necessary. Thus, a good received signal strength for a GNSS receiver in non-autonomous mode may be closer to a conventional GNSS receiver in acquisition mode, e.g., −150±3 dBm at the LNA input.

As discussed herein, clock synchronization between the mobile station and the base station may be sufficient that a minimum of three GNSS satellites can be used for the location estimation. Acquiring GNSS signals from three, rather than four, satellites may reduce energy consumption. However, the clock synchronization may be sufficiently poor that the resulting location estimate (from three satellites) is not particularly accurate (although it may be usable in some scenarios where accuracy is less important). Accordingly, in many commercial scenarios, the minimum number of satellites acquired by the mobile station tends to be four.

The particular satellites despread by the mobile station may or may not be the top three or four in the ranked list from the base station. For example, the line of sight to one of the top satellites may be temporarily blocked by an object. The mobile station may not obtain a good signal from this satellite in this situation. In this manner, the mobile station does not despread signals from more satellites than necessary to determine the position of the mobile station, thereby reducing energy consumption related to GNSS position determination. Furthermore, since the list of satellites from the base station can be ranked in part according to their visibility from the mobile station, proceeding according to the ranks on the list can minimize the number of satellites whose signals the mobile station despreads except due to unexpected causes such as a temporary blockage.

The mobile station can also compute an SNR for each satellite whose signals the mobile station attempts to receive. The SNR is a quality indicator of the received signals and can be computed with low energy consumption. The mobile station may send computed SNR to the base station as part of the message at block 311. The mobile station also can validate that there are no code phase errors as indicated at block 318. There may be different causes of code phase errors, including clock synchronization error, error in the estimate of the position of the mobile station (at block 302), GNSS signal propagation path error, etc. If a mobile station detects a code phase error, the mobile station may take one or more corrective actions. For example, the mobile station may return to block 302 and repeat the process therefrom, which may cure the error (e.g., by re-synchronizing the mobile station clock to the base station clock). The mobile station may increase the width of the search window for obtaining a peak out of the correlator, which may help resolve the error if it is due to an error in the estimated position of the mobile station. The mobile station may determine that signals from the satellite associated with the code phase error cannot be successfully acquired (at the moment) and proceed to preprocessing signals from another satellite on the acquisition list, or take another action in response.

The mobile station can fine tune its timing precision to, for example, an accuracy of a fraction (e.g., a quarter) of a chip, through the use of a code in GNSS signals with a higher chip rate. For example, the precision (P) code in the GPS system has a chip rate 10 times the chip rate of the C/A code. The mobile station does not have reference precision (P) code since precision (P) code is encrypted with secret military keys. However, for the purpose of determining chip transitions in a navigation message, the mobile station can rely on the low frequency of change of the encryption key, encryption (W) code, without being able to decrypt the encrypted P(Y) code. A chip transition can be located by shifting a digitized GNSS signal with respect to a correlator window and locating a peak in the correlator output. Through (indirect) clock synchronization with a GNSS satellite clock, a mobile station according to the present disclosure is able to locate a correlator peak within a smaller range of shifts compared with a conventional GNSS receiver/processor. For example, a shift window of ±2 µs may be sufficient assuming a normal distribution of clock synchronization error through the base-mobile RF link and a four-sigma code phase error tolerance level. Assuming that the chip interval is short relative to the shift range (which is likely if P(Y) is used), the shift range can be based primarily on the mobile station's clock synchronization accuracy at the time of capturing the sequence of chips that includes the chip transition in the baseband. For example, if we assume that the clock error is normally distributed, then a shift window of several (e.g., 1, 2, 3, 4, or more) sigma typically will be enough. Expected clock synchronization sigma is on the order 0.5*(1/RF link bit rate). Thus, in embodiments in which the RF link bit rate is about 1 Mbps, the shift window can be about ±2 µs for a 4-sigma shift range. In other embodiments, the shift rate can be in a range from about 0.5 µs to about 10 µs, 10 µs to 1000 µs, or some other range.

As a result of the fine tuning of the timing precision of the mobile station, in some implementations, the circuits for the correlator in the digital portion of the GNSS receiver/processor in a mobile station are smaller and consume less power than their counterparts in a conventional GNSS receiver/processor. In systems that use the P(Y) code for timing, the message sent from the base station to the mobile station at block 307 can include the code phase information of the encryption (W) code for each of the viewable satellites.

At block 312, the base station receives the message from the mobile station. Using the satellite signal transition timing information in the message, the base station can compute the position of the mobile station by solving GNSS navigation equations (e.g. computing position/velocity/time (PVT) solutions). The timing information may be sufficient for computation of the mobile station updated position, in which case the base station moves on to block 313. On the other hand, the timing information may turn out to be insufficient, and the base station is not able to compute the updated position of the mobile station. In that case, the process loops back to block 306 and repeats therefrom. Sufficiency of the timing information may be determined from a confidence level relative to a desired level of accuracy associated with a position estimate. The confidence level may in turn be based on a quality indicator sent by the mobile station. The desired level of accuracy may be different in different contexts or applications. Consistency of estimates calculated from timing information associated with different satellites in the same message can also provide a measure of confidence level. For example, if errors in the PVT solutions computed from the signals of a majority of satellites included in the timing information message are close to each other, while errors in the PVT solutions from a minority of satellites included in the timing information message are far apart from all the others (including, e.g., far apart from each other within the minority group), confidence level in the estimates from the majority group of satellites can be high while confidence level in the estimates from the minority group of satellites can be low. Confidence in correlator peaks can be indicated by a quality indicator such as a sharpness of a peak (e.g., full-width half-maximum), an SNR for a particular satellite at a particular time, and so forth.

At block 313, the base station can update its path record associated with the mobile station. The base station can also compute updated sleep parameters or an updated sleep zone for the mobile station. The base station then transmits the updated position to the mobile station. The base station can also transmit updated sleep parameters or updated sleep zone information to the mobile station. Where movements or actions of a mobile station are directed by or through a base station, the base station can compute and transmit instructions to the mobile station to direct its movements or actions. The base station may also compute and transmit data to assist the mobile station in adjusting its non-GNSS position sensors.

At block 314, after receiving the message from the base station, the mobile station updates its own position (based on the updated position received from the base station) and optionally adjusts or resets its position sensor, for example an inertial measurement system or a dead reckoning system. If the message also contains updated sleep parameters or updated sleep zone information, the mobile station can update its sleep parameters, either explicitly stated or derived from the information on sleep zone in the message. The mobile station may redirect its movements or actions according to instructions from the base station, if any. The mobile station can then transmit an acknowledgment (ACK) message and put itself into sleep mode (based on the sleep parameters), as indicated at block 315. The mobile station will next wake up and restart from block 301 according to its sleep parameters. The base station receives the ACK message from the mobile station, and the process completes a cycle at block 316.

A base station or a mobile station may determine sleep parameters based on a number of considerations. For example, in a geofencing application (such as, e.g., the shopping cart containment or livestock containment applications described herein), sleep parameters may be determined in part based on the present distance or a projected distance at a future time between a mobile station and the geofences or boundaries or obstacles in the confinement area within boundary 148. Sleep parameters can account for dynamic geofences, in which the boundaries of the geofence vary with time or other parameters. Distance between two mobile stations may be a factor in determination of sleep parameters where collision avoidance is desirable. Sleep parameters may include explicit wake-up or sleep conditions or information that a mobile station can use to compute wake-up or sleep conditions. Sleep refers to an inactive state of the GNSS portion of a mobile station. Other portions of the mobile station may remain active. For example, a processor and a sensor may remain active while the GNSS portion is in a sleep state to monitor the environment or status and to calculate new wake-up conditions based on changed environment or status as well as to process dead reckoning data.

The functions described with reference to FIG. 3 are intended to illustrate and not limit the scope of the disclosure. In other examples, one or more of the processing blocks can be rearranged, combined, or deleted.

Example Autonomous Mode and Unaided Mode

A low-energy GNSS mobile system can implement an autonomous mode for use when a mobile station does not have contact with a base station. A mobile station may lose contact with a base station for a variety of reasons, for example, a temporary communication path blockage, a temporary base station outage, or the stations being out of range of communication. A low-energy GNSS mobile system can reduce the occurrence of such situations by employing redundant base stations or through the optional use of the link repeaters 140 described herein. In autonomous mode, a mobile station may compute its position through GNSS signals via conventional GNSS methods. In autonomous mode, a mobile station may use cached ionospheric model to at least partially correct for errors in the position determination. A mobile station in a low-energy GNSS mobile system can reduce energy consumption in autonomous mode by sacrificing accuracy of position estimate. For example, not keeping the GNSS receiver on for the (relatively long) time it takes to receive ionospheric grid corrections via a Space Based Augmentation Service (SBAS) can reduce energy, although possibly at the expense of accuracy. Capturing a pseudorange from a satellite involves capturing chip transitions and performing position estimation. Multiple captured pseudoranges can increase the accuracy of the PVT solution. Accordingly, capturing fewer pseudoranges per satellite can also reduce energy, again possibly at the expense of accuracy.

A low-energy GNSS mobile system can also implement an unaided mode. In this mode, the mobile station does not provide an initial position estimate to the base station (see, e.g., block 302 of FIG. 3). The base station may perform the estimates at block 306 using either its own position or the last calculated position of the mobile station as the initial position of the mobile station. This mode can be effective where a mobile station does not travel far from a base station or between consecutive processing cycles. The frequency of processing cycles may be adjusted to increase the effectiveness of this unaided mode. This mode is useful when non-GNSS position sensors are not available on a mobile station.

Example Low-Energy GNSS Mobile Station Activity Timing

Figure 4:
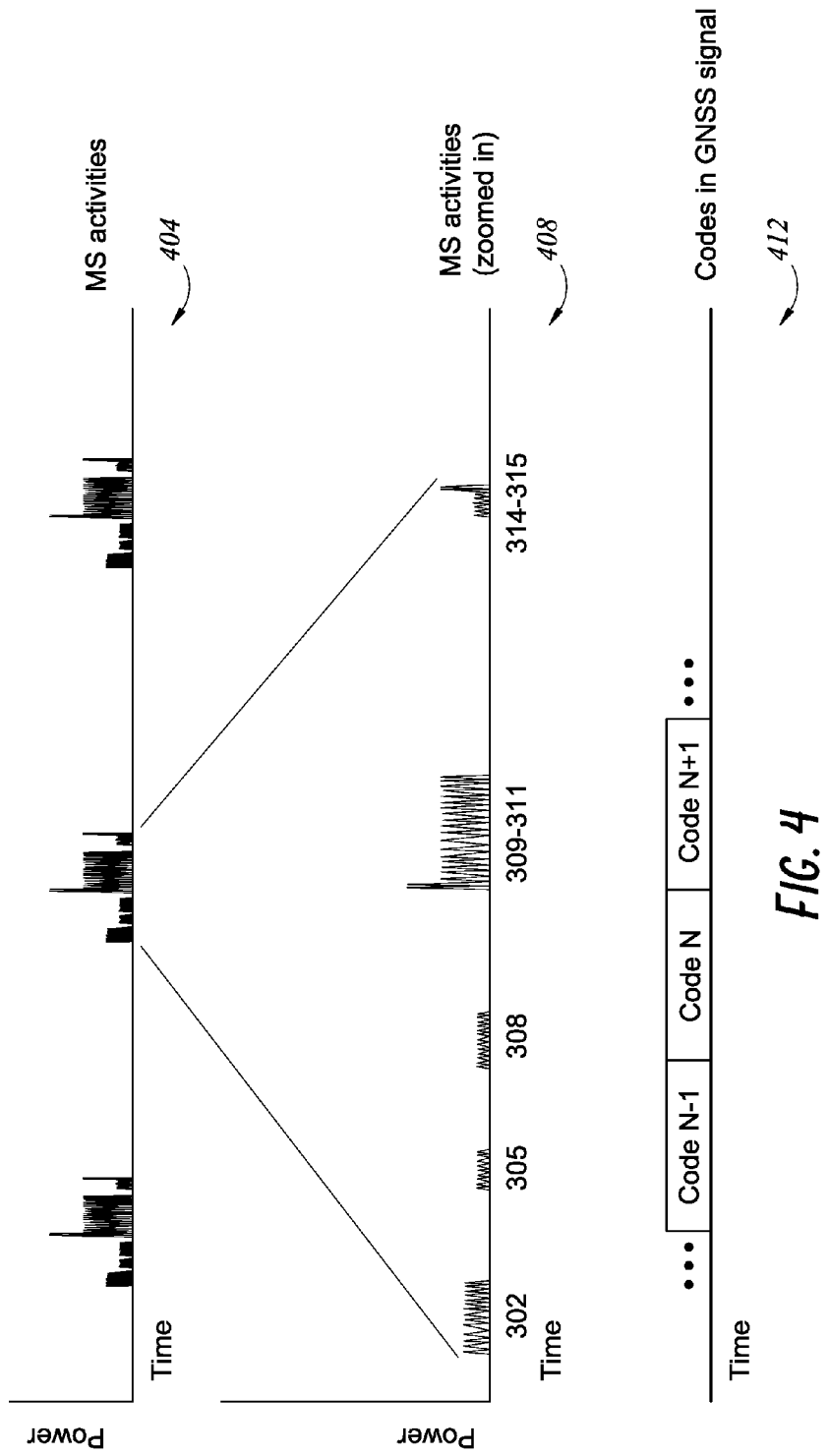
FIG. 4 illustrates example activity cycles of a mobile station.

FIG. 4 illustrates an example of activity cycles of an example mobile station. Graph 404 schematically shows examples of bursts of activities in the mobile station. The horizontal axes represent time. The vertical axes represent power consumption. In between the bursts are the sleep periods in which at least the GNSS portion of the mobile station is placed into a sleep mode and consumes little energy. The activity duty cycle is low to keep overall energy consumption low and can be adjusted based on considerations such as the speed of the mobile station, proximity of a mobile station to the tracking area boundary or to another mobile station, etc.

Graph 408 zooms in on one burst of activities in graph 404. The horizontal axis represents time (on a different scale than the horizontal axis in the graph 404). The vertical axis represents power consumption (on the same scale as the vertical axis in the graph 404). The numbers associated with the bursts in the graph 408 correspond to the block numbers in FIG. 3. Within a processing cycle illustrated in FIG. 3, there are bursts of activities within the mobile station. The width of a burst schematically illustrates the duration of an activity associated with a block in FIG. 3. The height of a burst schematically illustrates the average power consumed by an activity associated with a block in FIG. 3. The duration and the average power are tabularized below for this illustrative example. These values are provided for illustration and are not a limitation on the present disclosure. A different implementation can have a different set of values. Also, a different operating scenario using the same low-energy consumption GNSS implementation can result in a different set of values as well. For example, if system and environmental conditions permit a position estimate using a smaller number of received P(Y) chips (e.g., 1,000 are used for the estimate below), the power consumption associated with blocks 309 and 310 can be decreased.

| FIG. 3 Block Number (Active Mobile Station Components) | Duration (msec) | Average Power (mW) |
| --- | --- | --- |
| 302 (Processor and RF Transmitter) | 0.9 | 16 |
| 305 (Processor and RF Receiver) | 0.5 | 7 |
| 308 (Processor and RF Receiver) | 0.7 | 7 |
| 309 (Processor, GNSS Receiver, and Correlator) | 0.1 | 51 |
| 310 (Processor and Correlator) | 1.0 | 30 |
| 311 (Processor and RF Transmitter) | 0.3 | 30 |
| 314 (RF Receiver) | 0.3 | 9 |
| 315 (Processor and RF Transmitter) | 0.1 | 30 |

Graph 412 schematically illustrates an example of code phase transitions in a GNSS signal. Through clock synchronization and code phase information from a base station, a mobile station is able to initiate its signal acquisition at block 309 based on the timing of a code phase transition (e.g., a particular chip transition). Accordingly, the mobile station's GNSS receiver can be turned on for a relatively short time period to acquire the GNSS signals, thereby reducing energy consumption.

Example Preprocessed GNSS Data

Figure 5:
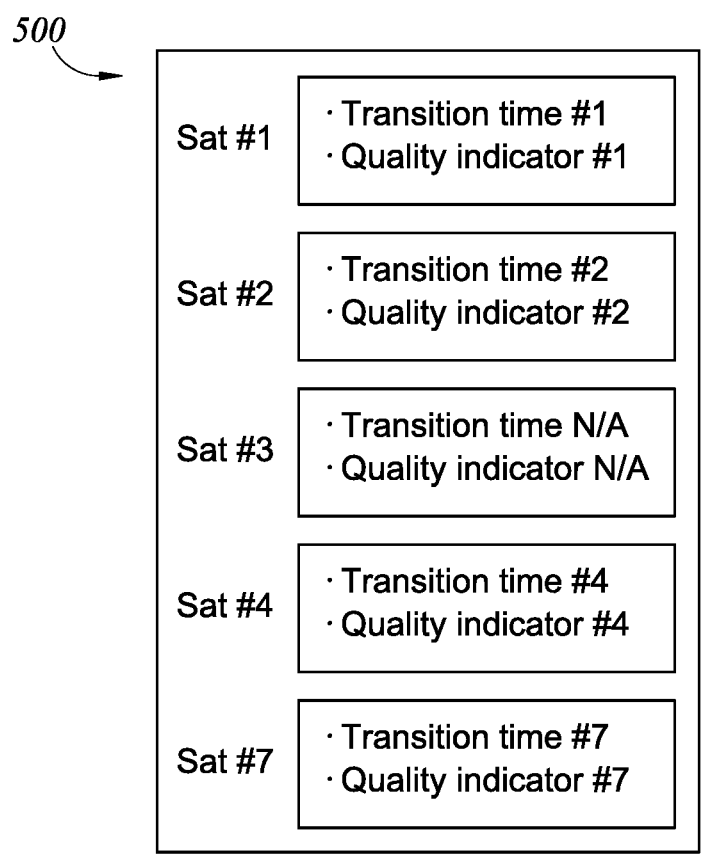
FIG. 5 illustrates example preprocessed GNSS data.

FIG. 5 illustrates example preprocessed GNSS data. In response to its receipt of GNSS signals, the mobile station generates preprocessed GNSS data 500 and transmits the data to the base station, for example, as shown at blocks 311 and 312 in FIG. 3. In this example, the preprocessed data 500 contains the estimated chip transition times of several of the satellites in the set of viewable satellites sent by the base station, e.g. the satellites whose signals the mobile station attempted to acquire. The data 500 optionally contains a quality indicator of the signals from each of the several satellites. When a mobile station fails to acquire the signal from a satellite, the mobile station may so indicate in the preprocessed data. In the illustration, the mobile station fails to acquire satellite #3. Thus the preprocessed data associated with satellite #3 are shown as not available (N/A). To compensate for the failure to acquire satellite #3, the mobile station acquires satellite #7 and includes preprocessed data for satellite #7. Substituting satellite #7 for satellite #3 can be due to direction of interest considerations, as described in connection with description of block 307 in FIG. 3 above.

The amount of preprocessing done in a mobile station and the content of the preprocessed data may change based on factors such as technology, complexity of design, and energy consumption limitations. One primary objective of the low-energy GNSS mobile system is to reduce energy consumption of the mobile stations. Where energy consumption of a mobile station can be reduced by performing more preprocessing and transmitting a shorter preprocessed data message (it takes less energy to transmit a shorter message), it may be beneficial to make such an implementation. This may be the case as advances in semiconductor technology reduce power consumption associated with processing. Power consumption associated with transmission, on the other hand, may be limited at least in part by physics and may not scale directly with advancement in technology. Accordingly, the low energy GNSS system may perform an optimization process to select the amount of preprocessing for the mobile to perform and the amount of preprocessed data 500 to transmit to the base station.

Example Machine Learning

A base station or a remote server (e.g., the CCU 128) may accumulate statistical information regarding the ability of the mobile stations to acquire signals from the GNSS satellites. Such statistics may be used to improve a base station's model of the tracking area, mobile station conditions, and/or future satellite selections. For example, in the preprocessed data 500, the mobile station may additionally indicate that it fails to acquire satellite #3 because the peak in the correlator output is too wide. If, over time, statistics show that a particular mobile station frequently encounters similar acquisition failures for satellites in a certain orientation with respect to the mobile station, the base station can conclude that the mobile station is malfunctioning, or the base station can incorporate the mobile stations deficiency in this certain orientation in its model of the mobile station. The base station can then flag the mobile station as a candidate for maintenance, or can eliminate satellites in that certain orientation in future ranked lists of satellites sent to this mobile station. As another example, if statistics show that mobile stations in a particular locations in the tracking area (e.g., within the boundary 144) generally have issues in acquiring satellite signals from a satellite in a certain direction, the base station can conclude that some sort of obstacle exists in that direction and update its model of the tracking area. This can be helpful where a map, e.g. of a tracking area used by the base station does not have (up-to-date) elevation information.

In various implementations, the base station or the CCU may utilize a machine learning algorithm to process the accumulated satellite acquisition statistics in order to update the environmental model in which the mobile stations move, learn that previously unknown obstacles are present (and block GNSS signals from certain directions), or learn other patterns that can be used to transmit better satellite acquisition parameters to the mobile stations. The machine learning algorithms can include neural networks, decision trees, support vector machines, probabilistic methods (e.g., Bayesian networks), data mining, and so forth. The machine learning techniques can be supplemented with a geographic information system (GIS) that analyzes or provides geospatial data about the tracking environment.

Example Operation Scenarios

Figure 6A:
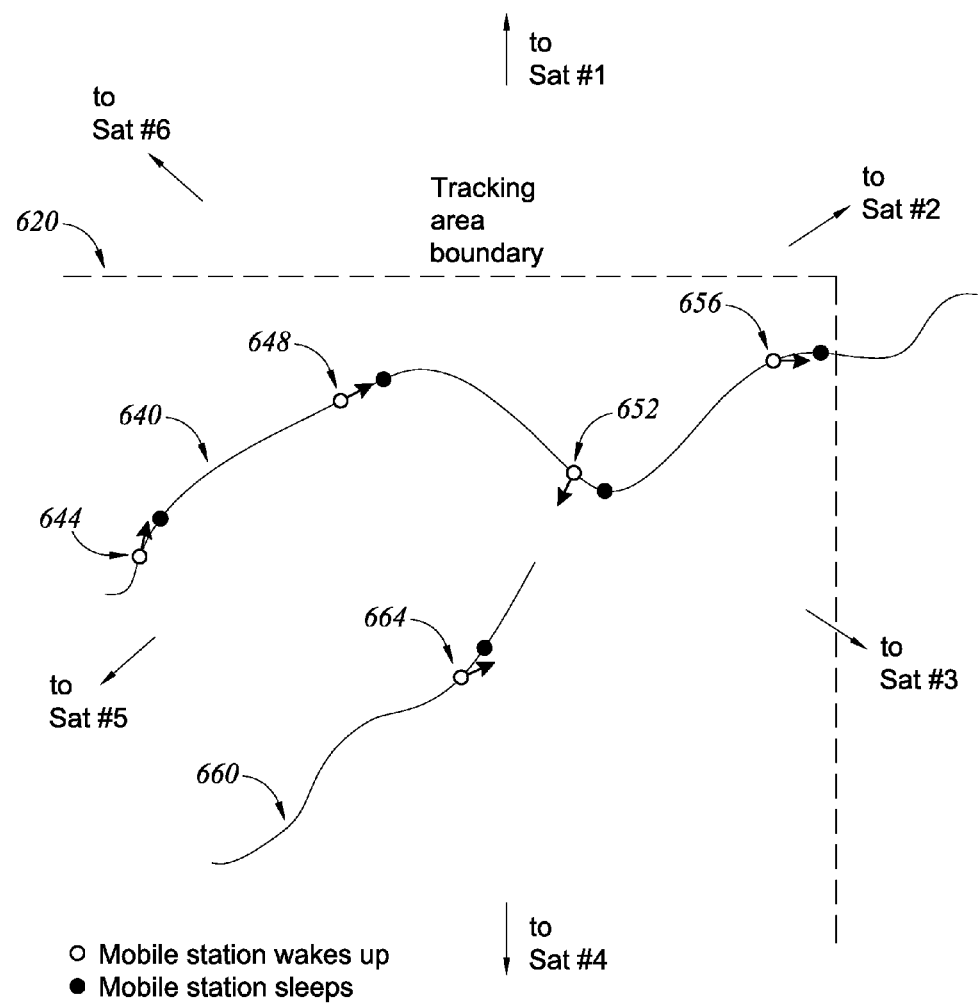
FIGS. 6A and 6B illustrate some example operation scenarios of a low-energy GNSS mobile system.

FIG. 6A illustrates examples of some operation scenarios of a low-power GNSS mobile system. A dashed line 620 denotes the boundary of a tracking area. Curves 640 and 660 illustrate movements of two mobile stations, mobile station A and mobile station B, respectively. Open circles on the curves denote positions when the mobile stations wake up from a sleep mode. Solid circles on the curves denote positions when the mobile stations enter a sleep mode. Small arrows from open circles illustrate direction of interest at that position/time. A direction of interest might include a direction toward a nearby mobile station or other obstacle (e.g., to avoid collision) or a direction toward the nearest portion of the tracking area boundary 620 (e.g., where a confinement action may occur in a geofencing scenario). Six arrows around the perimeter illustrate locations of GNSS satellites relative to the tracking area.

When more GNSS satellites are visible from a mobile station, it can be beneficial for a base station to rank satellites based at least in part on their contribution to the accuracy in a direction of interest. A position estimate has varying degrees of uncertainty in different directions relative to the directions of the satellites whose signals form the bases of the estimate. GDOP is a source of such effects. As another example, it is usually desirable to resolve a mobile station's position to a greater degree of accuracy in the direction of the mobile station's movement.

When mobile station A wakes up for the first and second time in the illustration in FIG. 6A, the direction of interest associated with the position of mobile station A is the direction of its movement. This is shown by the two small arrows which are closely aligned with the curve at the two leftmost open circles, 644 and 648, on curve 640. Accordingly, a base station may rank satellites #1 and #4 higher for the first wake up cycle (starting from open circle 644) because these two satellites are more closely aligned with the direction of interest than other satellites. Since satellites #1 and #4 are almost in opposite directions from the perspective of mobile station A, using both in a position estimate also reduces GDOP. For the same reason, a base station may bias toward satellites #2 and #5 in ranking the satellites for the second wake up cycle (starting from open circle 648). When the mobile station A wakes up a third time in the illustration (starting from open circle 652), the mobile station B is approaching the mobile station A, as indicated through curve 660 and open circle 664. The direction of interest associated with mobile station A points to the mobile station B because collision avoidance becomes an important consideration. Accordingly, a base station can bias toward satellite #2 which is most closely aligned along the direction of interest (though in the opposite direction). During the fourth wake up cycle (starting from open circle 656), the mobile station A is close to the tracking area boundary 620. Thus the dominant direction of interest points to a point on the boundary closest to mobile station A.

An implementation of a low-energy GNSS mobile system can estimate the orientation or direction of movement of a mobile station through one or more ways. For example, a mobile station can estimate its orientation based on data from dead reckoning sensors. A base station or a mobile station can estimate the orientation of the mobile station based on a history of positions of the mobile station. This history may be based on GNSS data, non-GNSS data, or a combination of the two.

Figure 6B:
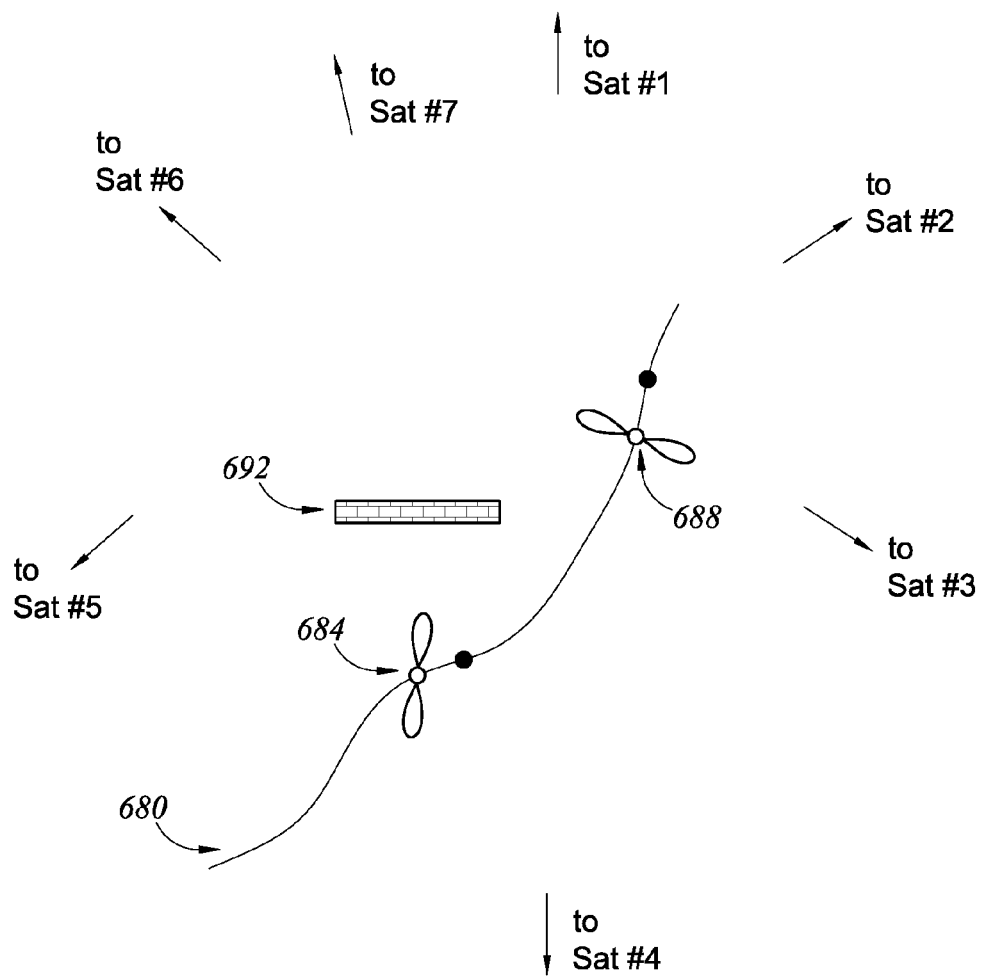

FIG. 6B illustrates additional examples of operation scenarios of a low-energy GNSS mobile system. Graphical representations similar to those in FIG. 6A are used. Additionally, FIG. 6B shows a rectangle 692 representing a structure which can obstruct a line of sight to a satellite. The structure can be a building, a hill, a large vehicle (e.g., a truck), etc. Wing-like lobes attached to the open circles schematically represent antenna patterns associated with the mobile station GNSS antenna.

Where an antenna pattern of a mobile station GNSS antenna is not hemispherical, a base station may include the antenna pattern and the orientation of the mobile station as factors in ranking the satellites. A base station can bias against selecting satellite in a weak direction of the mobile station antenna pattern. By decreasing the ranks of satellites in a weak direction of antenna pattern, a base station can lower the likelihood that a mobile station processes a weak signal due to the antenna pattern or fails to acquire the satellite at all, thereby reducing energy consumption of the mobile station. For example, during the second wake up cycle (starting from open circle 688 on curve 680), a base station with a knowledge of the mobile station's antenna pattern and orientation can bias toward satellites #3 and #6 and against satellites #1 and #4 in the ranked list.

Where a base station has information related to the local environment, the base station can account for such information in the selection of satellites. In the illustration, a structure 692 exists in the tracking area. The structure obstructs the line of sight between satellite #7 and the mobile station during the first wake up cycle (starting from open circle 684 on curve 680). The structure perhaps also obstructs the line of sight between satellites #1 and #6 and the mobile station during the same wake up cycle. Thus, with information on the locations of the satellites, the structure, and the mobile station, a base station may bias against selecting satellites #7, #1, and #6 for the mobile station. The obstruction bias can override or outweigh the antenna pattern bias.

As described above, the low energy GNSS system can analyze satellite acquisition behavior obtained from the mobile stations to learn about the tracking area. For example, the structure 692 may not have initially been present in GIS information about the tracking area but the structure's presence may have been deduced from the satellite acquisition data, via machine learning. Accordingly, such embodiments of the GNSS system can continually or periodically update their understanding of the tracking area, acquisition patterns of the mobile stations, and so forth to provide better estimates of satellite acquisition parameters.

Example Flow for Clock Synchronization of a Low-Energy GNSS Mobile Station

Figure 7A:
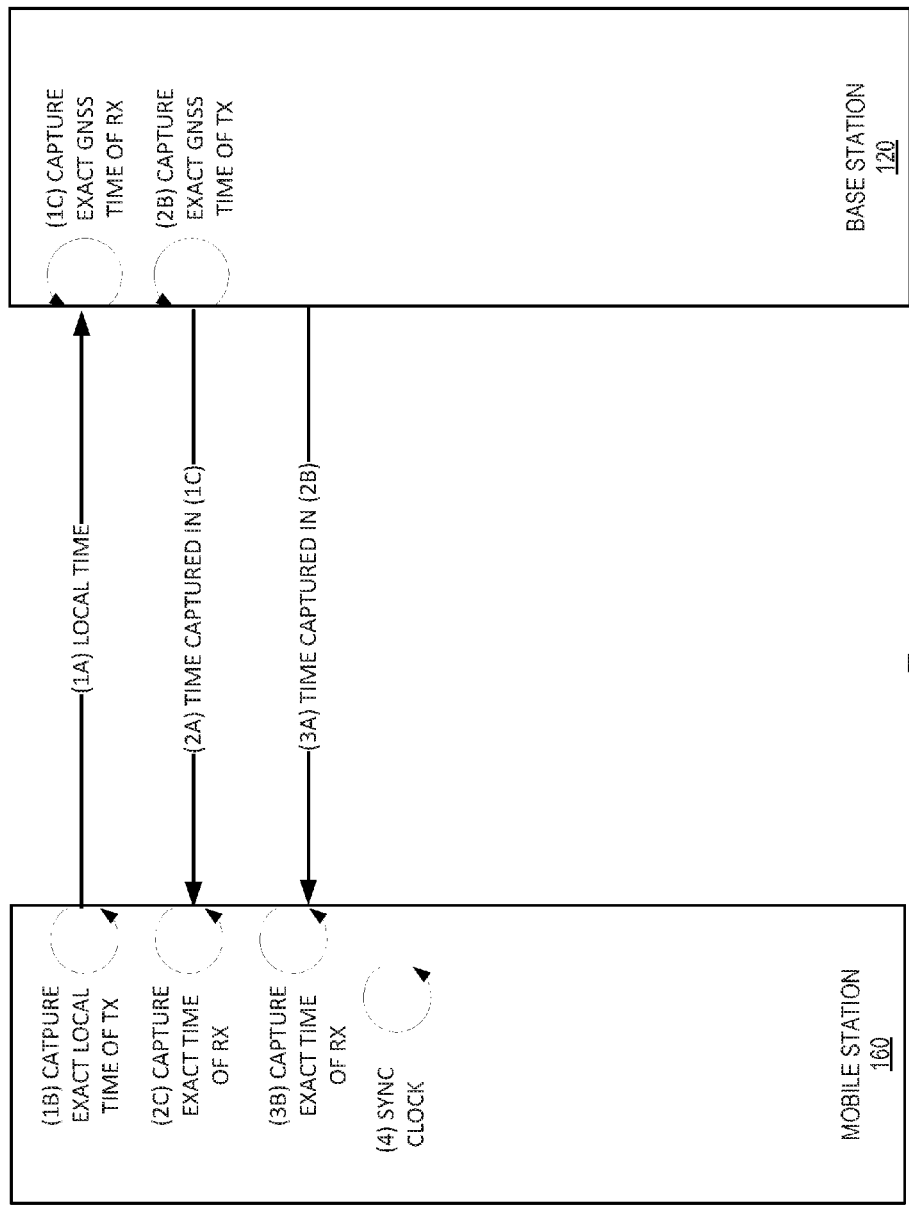
FIG. 7A illustrates an example flow for synchronizing the clock of a mobile station.

FIG. 7A illustrates an example flow for synchronizing the clock of a mobile station. To maintain clock synchronization with a GNSS satellite clock continuously is costly in energy consumption. A base station connected to an external power source is not energy constrained, and therefore may maintain continuous clock synchronization with a GNSS satellite. A mobile station, on the other hand, is usually powered by a limited energy source and may not be able to afford to maintain continuous clock synchronization, without depleting its power source. Thus a mobile station may only synchronize its clock on an as-needed basis. For example, a mobile station may synchronize its clock at the beginning of each wake up cycle (or every third, fifth, tenth, or hundredth wake up cycle). Furthermore, a mobile station may be subject to a variety of environmental stresses, e.g. temperature cycles, physical shocks and vibrations, etc. Environmental stress can damage or perturb a mobile station's clock oscillator, increase timing errors of the oscillator, and increase the need for clock synchronization in the mobile station.

Precision timing protocols, such as a double message clock synchronization algorithm in the Institute of Electrical and Electronics Engineers (IEEE) 1588 standard, can be applied to a low-energy GNSS mobile system for clock synchronization. A processor or a controller can apply frequency and phase compensation on a numerically-controlled oscillator (NCO). Long-term sources of error associated with an oscillator may be compensated, leaving short-term jitters with zero mean. An implementation of a low-energy GNSS mobile system can synchronize the clock of a mobile station indirectly to a GNSS satellite clock through the clock in the base station. The synchronization may be accomplished through a plurality of communication messages and processing in the mobile station.

In FIG. 7A, a mobile station 160 initiates a clock synchronization sequence by transmitting (TX) its local time to a base station 120 and timestamping the transmission (illustrated by (1A) and (1B)). Upon receiving (RX) the transmission, the base station timestamps the reception according to its local clock (1C). Since the clock of the base station is synchronized to a GNSS satellite clock, the value of a base station's clock is the same as the value of a satellite's clock at the same moment in time. The base station then responds by sending the reception timestamp value (1C) and also timestamps the response ((2A) and (2B)). The mobile station receives the message (2A) and timestamps the reception according to the mobile station's local clock (2C). The base station sends another message to the mobile station, including the timestamp value (2B) at the base station's last transmission. The mobile station receives this second message (message (3A)) and timestamps the reception (3B). The mobile station is then able to synchronize its clock to the clock of the base station based on the time values captured locally and the time values sent from the base station. As a part of the synchronization, the mobile station can correct for the speed of light to account for communication path delays. The phrases "timestamps the transmission" (or reception/response) include, but are not limited to, marking the exact time at a known time relative to the time when the start of the transmitted (or received) message passes through a certain system element, e.g., when the start of the message signal is emitted from the antenna, 5 μs after the start of the message is received at the receiver input, etc. A base station or a mobile station may include timestamping hardware in precision clock support block 252 and 292, respectively. A message containing a special timestamp data field and/or value can trigger the timestamping hardware to capture a timestamp. Offsets in timestamps, which should be excluded in clock synchronization processing, can be characterized and reduced or eliminated from the processing.

An advantage of mobile stations having clocks that are time synchronized to the base station clock, and thereby to the GNSS satellite clocks, is that fewer (three rather than four) satellites are needed to provide a precision position estimate for the mobile station.

The example clock synchronization algorithm illustrated in FIG. 7A may rely on an assumption that a direct RF path exists between a base station and a mobile station. For example, the algorithm may compensate for the length of time messages spend in transit between the two stations based on a nominal distance of a direct path calculated using the position of the base station and the estimated position of the mobile station. There can be situations where this assumption is not true. For example, a temporary blockage such as a truck may be present in the direct RF path between a base station and a mobile station. In such situations, RF signals can travel on a reflected path rather than a direct path between the two stations.

The reflected path can degrade RF signals such that the two stations cannot establish communication through the direct path. If this happens, the two stations can try to establish communication through a link repeater, if available, or the mobile station can enter an autonomous mode until communication with a base station is established. In an implementation where a base station transmits at a higher power level on the RF link than a mobile station, the mobile station may be provided with the transmit power level of the base station. The mobile station can determine whether the base station can receive communication from the mobile station on the RF link using information on the transmit power level of the base station, an actual received power level of RF signals from the base station, the transmit power level of the mobile station, and/or receiver sensitivity of the base station.

The RF signals from the base station through which actual received power is determined can be a ready signal indicating the availability of the base station. If a mobile station determines that messages from the mobile station cannot be received by the base station under a present condition of the RF path, a mobile station may enter into an autonomous mode, may temporarily increase its transmit power on the RF link (at a likely expense of increased energy consumption), and/or the two stations may proceed with communication (including clock synchronization messages) through a link repeater with which both stations have a direct RF path, to give three example responses.

If communication through the RF link between the two stations can be established through the reflected path, actual length of time for a message to travel between the two stations can be longer than the length of time expected on the direct path. The longer travel time, if uncompensated, can introduce a timing offset to the mobile station's clock relative to the base station's clock. This timing offset, in turn, can degrade the accuracy of or cause a code phase error during a position estimate. A small timing offset may degrade the accuracy of a position estimate. An example of a small timing offset is an offset on the order of a chip time or less, e.g., less than 100 nanoseconds at the 10.23 MHz P(Y) code rate, which translates to about 100 feet difference between the direct path and a reflected path at the speed of light. A larger timing offset can cause a code phase error during a position estimate. An example of a larger timing offset is an offset on the order of several chip times, e.g., several hundred (e.g. 500, 700, etc.) nanoseconds at the 10.23 MHz P(Y) code rate, or about several hundred (e.g. 500, 700, etc.) foot difference between the direct path and a reflected path. The cutoff between a large timing error and a small timing error typically varies with implementation. The example values provided above are for illustration and not a limitation.

One way to reduce the likelihood of code phase error due to a lack of a direct path is to increase the width of the search window for obtaining a peak out of the correlator in a mobile station (although, at a likely expense of increased energy consumption at the mobile station). The cutoff between a large and a small timing error can be increased with the increase in the width of the search window. It may be also feasible to detect a reflected path through the actual RF path loss (transmitted power minus received power). If the actual RF path loss is much greater than expected given the nominal distance and the two antenna gains, a mobile station or a base station may conclude that a received RF signal traveled via a reflected path. In response, a mobile station may temporarily increase the width of the search window, or the two stations may proceed with clock synchronization through a link repeater with which both stations have a direct RF path, to give two example responses.

Example Flow for Clock Synchronization Involving a Link Repeater

One or more link repeaters 140 optionally can be used to relay messages between a base station and a mobile station where a tracking area may extend beyond the range of communication between a base station and a mobile station, or where objects may block the direct RF paths from a base station to places where a mobile station may perform a GNSS position estimate. Where one or more link repeaters are used, the link repeaters are usually installed such that a mobile station at any spot in a tracking area (e.g. area enclosed by boundary 144) can communicate with a base station, either directly or indirectly through one or more link repeaters. Communication between a base station and a mobile station may be relayed through one or a plurality of link repeaters. As the position of a mobile station changes, different link repeaters and/or different number of link repeaters may be involved in communications between the mobile station and the base station. The link repeater can communicate (e.g., via an RF link) with the base station and relay the base station's messages to the mobile stations (e.g., also via an RF link).

Figure 7B:
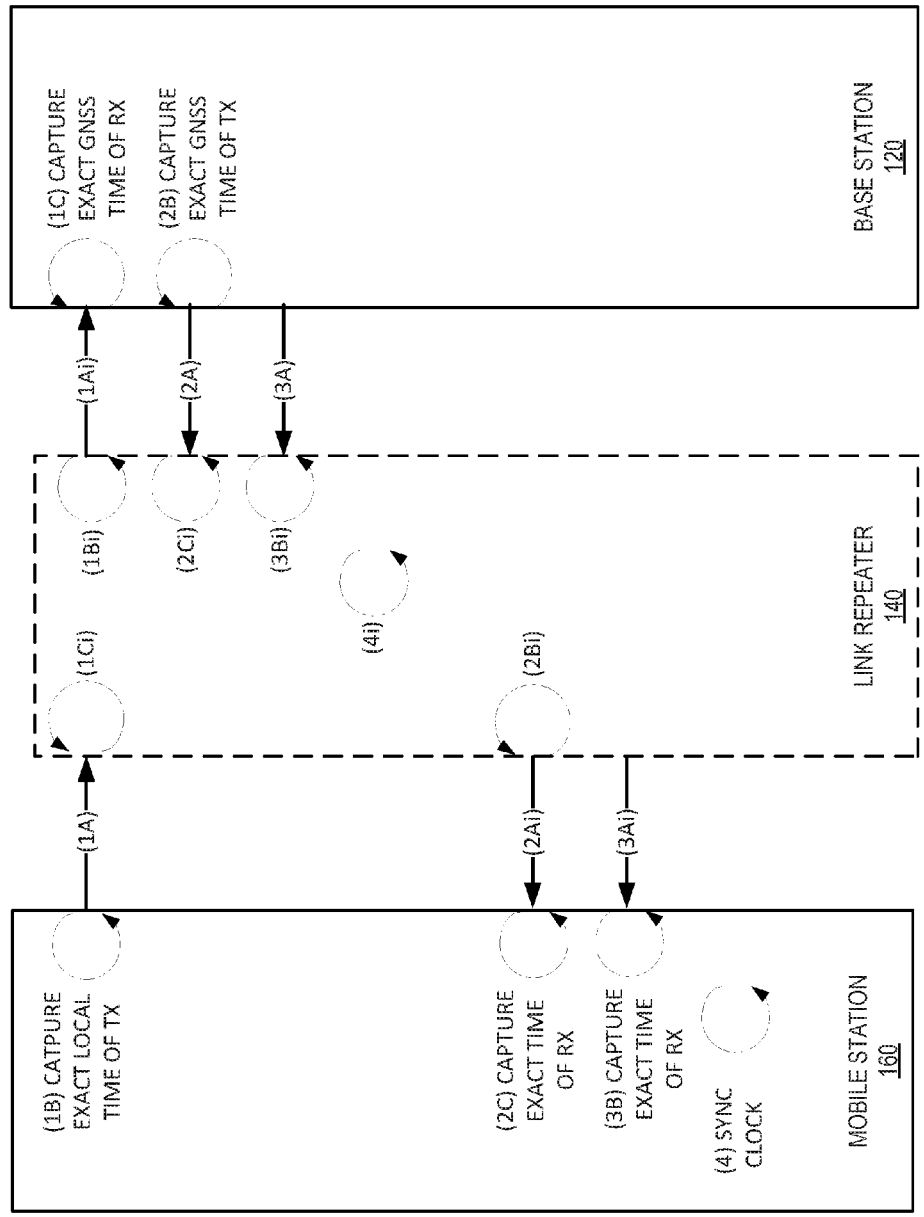
FIG. 7B illustrates an example flow for synchronizing the clock of a mobile station involving a link repeater.

Like a base station, a link repeater may transmit at a higher power level on the RF link than a mobile station. A link repeater may transmit a ready signal periodically to indicate its availability. A base station may instruct a link repeater to turn off transmission of ready signals when no mobile station relies on the link repeater for communication, and to turn on transmission of ready signals when a mobile station relies on the link repeater for communication. FIG. 7B illustrates an example flow for synchronizing the clock of the mobile station 160 through a link repeater 140. The alphanumeric references represent similar action or events as in FIG. 7A. For example, (1A) represents a local time message from the mobile station 160 in both FIGS. 7A and 7B. Actions or events associated with the link repeaters 140 are designated with a corresponding alphanumeric reference, with a small "i" appended to the end. For example, (1Ai) represents a local time message from the link station 140. As another example, (4) represents synchronization of the mobile station clock; (4i) represents synchronization of the link repeater clock.

The implementation illustrated in FIG. 7B is a two-part process. Each of the two parts involves actions similar to those illustrated in FIG. 7A. In the first part, after a mobile station initiates a clock synchronization sequence, the link repeater synchronizes its clock to the clock of the base station. At the end of the first part, the clock in the link repeater is synchronized to the base station clock and hence to a GNSS satellite clock. In the second part, the mobile station synchronizes its clock to the clock of the link repeater. At the end of the second part, the clock in the mobile station is synchronized to the link repeater clock and hence to the GNSS satellite clock. Where a plurality of link repeaters relay communication between a mobile station and a base station, the implementation illustrated in FIG. 7B may be extended to cover the plurality of link repeaters.

Other implementations may be utilized. For example, if the link repeater is kept synchronized to the base station clock (e.g., in the background), then the first part of the process illustrated in FIG. 7B may not be necessary. Further, it may not be necessary to synchronize the clock of the link repeater if latency through the link repeater can be characterized precisely. In other embodiments, the clock of the link repeater may be periodically or continuously synchronized with the base station clock and not necessarily synchronized just in response to a request from the mobile station. The clock of the mobile station can be synchronized to the clock of the link repeater on an as-needed basis.

Example Pseudolite System Implementation

Figure 8:
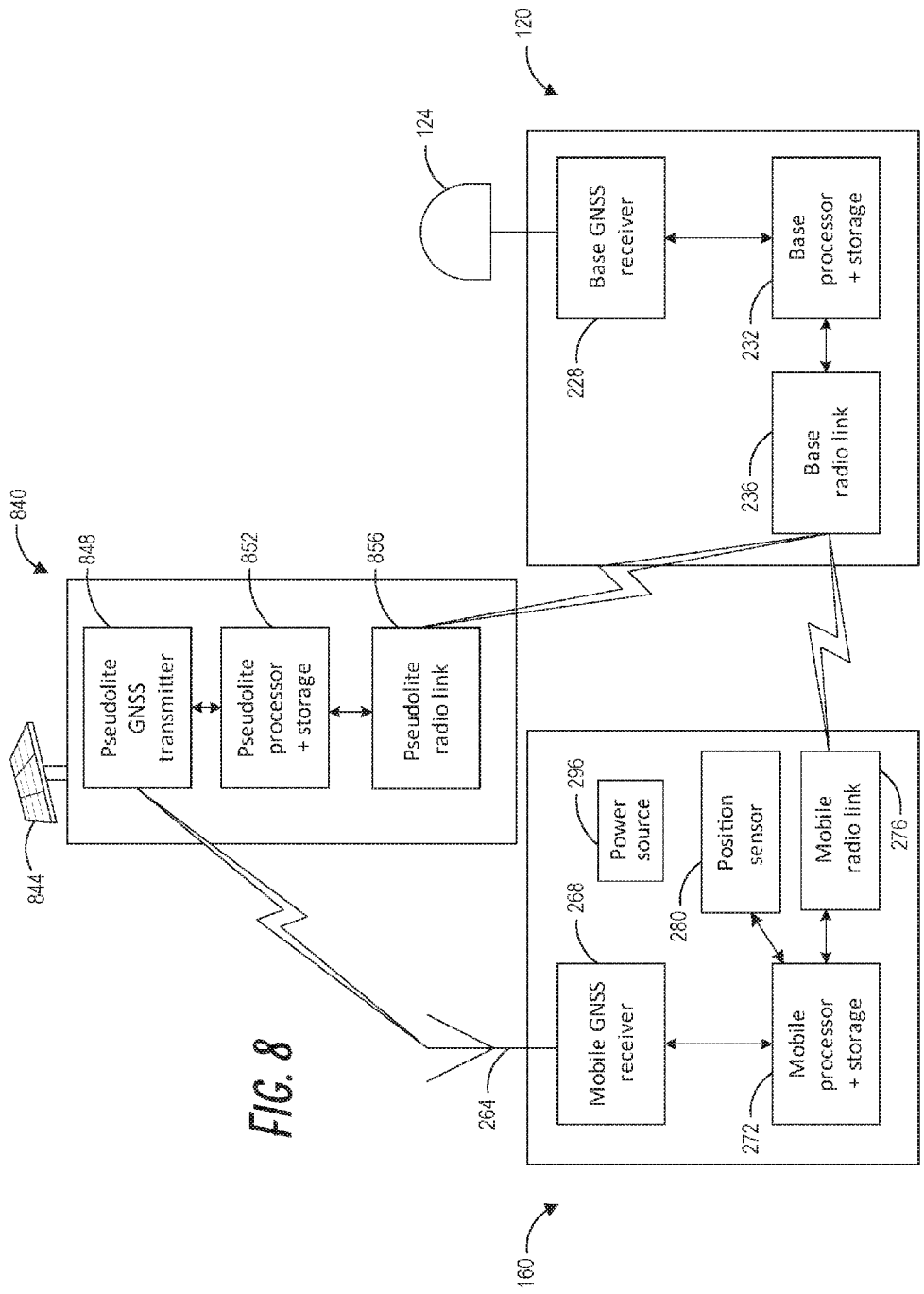
FIG. 8 illustrates an example implementation of a low-energy GNSS mobile system including a pseudolite.

As described above, pseudolites can provide GNSS signals where line of sight to a GNSS satellite is obstructed. FIG. 8 illustrates an example implementation of a low-energy GNSS mobile system including pseudolites. One pseudolite 840, one base station 120, and one mobile station 160 are shown for the purpose of illustration, not by way of limitation. The base station 120 and the mobile station 160 are generally the same as illustrated in the example shown in FIG. 2A. The pseudolite 840 contains a GNSS transmitter 848, a processor and data storage unit 852, a radio link 856, and a solar panel 844.

At installation of a pseudolite, its precise location can be entered and stored in its data storage. A pseudolite includes this location data when generating a navigation message to send through a navigation signal (analogously to the location data transmitted from the GNSS satellites). The navigation signal can comprise a GNSS-like signal. Alternatively or additionally, the location data of a pseudolite can be stored in a base station's data storage. The base station can transmit this location data to a mobile station via the base-mobile radio link. Because the location of the pseudolite typically doesn't change (e.g., it is fixed), or changes only infrequently (e.g., if the pseudolite is relocated), the base station may transmit the pseudolite location information to the mobile station once (e.g., for fixed pseudolites) or as needed (e.g., if the pseudolite is relocated). The mobile station can store this location data in its data storage. The stored location data in either a base station or a mobile station can take the place of location data (ephemeris) in GNSS satellite signals for the purpose of position estimation involving a pseudolite; the location data may be omitted from GNSS signals from the pseudolite. For the purpose of this disclosure, GNSS signals from a pseudolite may, in some cases, not contain the same or similar data structures as those used in GNSS satellite signals. For example, GNSS-like signals from a pseudolite may contain data, spread in such a way such that a mobile station can obtain chip transition times from the signal. The data in GNSS-like signals may include a set of chip transitions at specific synchronized times. The GNSS-like signals can include a timing code (analogous to the C/A or P(Y) codes) modulated onto a pseudolite carrier frequency. The GNSS-like signals may be spread such that the same correlator in the GNSS receiver that analyzes the GNSS signals from satellites can additionally or alternatively analyze the GNSS-like signals from the pseudolite. The pseudolite navigation signal may include information that uniquely identifies the pseudolite, e.g., the navigation signal may modulate a PRN code on a pseudolite carrier frequency.

A pseudolite transmits GNSS or GNSS-like signals through the transmitter 848. A mobile station receives the GNSS signals through its antenna and receiver. A pseudolite may communicate with a base station over the same unlicensed RF band used for base-to-mobile communication, as illustrated in FIG. 8. Alternatively, a pseudolite may communicate with a base station over a wired connection.

As described above in the overview, it may be advantageous, in some implementations, to use an unlicensed frequency band close to a frequency band used by the GNSS satellites. For example, an unlicensed band exists in the frequency range 1626.5 MHz to 1645.5 MHz in the United States, close to the GPS L1 frequency band. As a result, an implementation of a mobile station may include a tunable antenna and analog receiver which can function in both the unlicensed band and in the L1 band. Using one tunable antenna and analog receiver for both frequency bands typically means that the mobile station can receive from either GNSS satellites or from pseudolites at any given time, not both at the same time.

In various implementations, the pseudolite RF transmission band can have a bandwidth of less than about 10 MHz, 20 MHz, 30 MHz, or 50 MHz, or can be in a range from about 10 MHz to 100 MHz, and the pseudolite RF transmission band can have a carrier frequency that is separated from a GNSS satellite carrier transmission frequency (e.g., L1) by less than about 100 MHz, less than about 75 MHz, less than about 60 MHz, less than about 50 MHz, or less than about 25 MHz. Currently in the U.S., the FCC rules are such that the only chunk of spectrum that is near L1 and is allowable for unlicensed use is 1.6265 GHz to 1.6455 GHz, so currently the maximum allowable bandwidth of the pseudolite RF transmission band in the U.S. is 18 MHz, with the signal centered at 1.6355 GHz. However, the 18 MHz bandwidth is sufficient to encode a signal with a chip rate of the same 10.23 MHz as the P(Y) code.

In a low-energy GNSS mobile system, a base station can send a set of satellites and associated code phases to a mobile station. The mobile station then acquires GNSS signals based on the code phase timing information provided by the base station. Thus, a base station can in effect determine the timing of GNSS signal acquisition by a mobile station. A base station can instruct a pseudolite to transmit at the time a mobile station is expected to start signal acquisition. Since a mobile station only acquires GNSS signals for a short duration, a pseudolite may transmit only for a correspondingly short duration. A pseudolite can pause its transmission of GNSS signals until mobile stations will again seek to acquire signals from the pseudolite. This low duty cycle of transmission from the pseudolites is beneficial where legal operation in an unlicensed band is determined based on an average transmission power. For example, Federal Communications Commission regulations permit up to a 20 dB increase in transmit power with duty cycling. The low duty cycle of transmission permits an actual transmission power (for a short duration) much higher than the legally permitted average. A higher actual transmission power in turn translates to either higher SNR or longer communication range from the pseudolite.

Moreover, multiple GNSS satellites transmit simultaneously. Even a slight timing error in a GNSS receiver can introduce inter-code interference among signals from different satellites, reducing received SNR. Where an installation of a low-power GNSS mobile system includes multiple pseudolites, a base station may instruct each pseudolite to transmit at a different time, eliminating inter-code interference and increasing received SNR in a mobile station whose receiver timing is off. In an implementation where each pseudolite transmits at a different time, the PRN code used by all pseudolites can be the same since inter-code interference is not a significant concern. However, different pseudolites may use different PRN codes to permit identification or error checking. A base station may configure the sleep parameters sent to all mobile stations in the vicinity such that all mobile stations would seek to acquire signals from the same pseudolite at the same time.

If a base station determines that there are no mobile stations in the vicinity of a pseudolite, the base station may instruct the pseudolite to remain off. This reduces energy consumption of a pseudolite even further. The power consumption of a pseudolite may be low enough so that an alternative energy source, for example, a solar panel 844 may be used. Other alternative energy sources include wind power.

A pseudolite may synchronize its local clock to the base station clock, which is itself representative of the GNSS satellite time, just before the pseudolite sends its GNSS-like signal by using a clock synchronization method similar to that used by mobile stations to synchronize their clocks to the base station clock (see, e.g., the description with reference to FIG. 7A). Such synchronization may be advantageous for power-constrained pseudolites, because conventional pseudolites normally use a relatively high power temperature compensated crystal oscillator (TCXO) plus a GNSS receiver to correct long term drift of the pseudolite clock. Keeping the TCXO and GNSS receiver running costs a fair amount of power and also of course adds hardware cost.

In certain embodiments, the pseudolite only transmits when commanded by the base station (e.g., because a mobile station needs a navigation signal from the pseudolite), and the pseudolite may not need to have a precision clock all the time. A pseudolite that works with a mobile station in autonomous mode (e.g., when the RF link to the base station is lost) would generally transmit quasi-continuously, since the pseudolite generally will not know when a mobile station desires to perform a position fix. In some such implementations, as long as the pseudolite is in communication with the base station (possibly via link repeaters), the pseudolite can run the clock synchronization protocol in the background and avoid having to run a GNSS receiver and TCXO, which reduces energy use.

Figure 9:
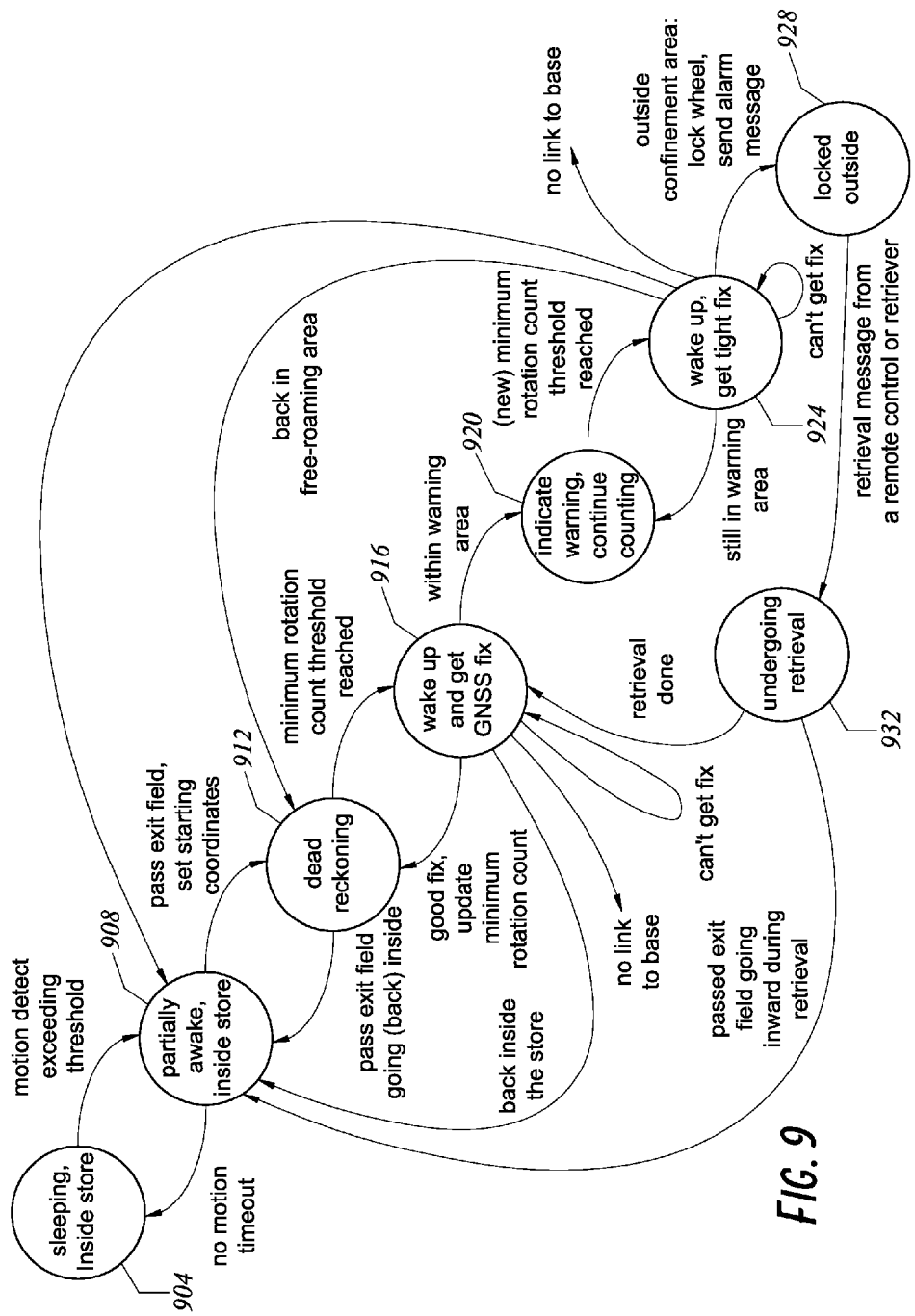
FIG. 9 illustrates an example state diagram involving a low-energy consumption GNSS mobile system in an example retail application.

Example State Diagram Involving a Low-Energy Consumption GNSS Location System in a Retail Application FIG. 9 shows an example state diagram involving for an embodiment of the low-energy consumption GNSS location system in a retail store application. In this example application, human-propelled shopping carts are to be located and contained within a confinement boundary (e.g., the perimeter of a parking lot near the store). As described above, the mobile station 160 can be disposed in a wheel of the shopping cart and/or in other parts of the cart (e.g., a frame or a handlebar). A mobile station 160 may be attached to a shopping cart or be an integral part of the cart. The mobile station 160 may have components located in different parts of a cart, e.g., a GNSS portion in the cart frame or handlebar (where the GNSS antenna can more readily receive signals from orbiting satellites) and a dead-reckoning sensor in a wheel of the cart (where wheel rotation can be measured to gauge distance traveled). In a retail store installation, the GNSS antenna 124 of the base station 120, if bulky or not aesthetically pleasing, can be placed at the back side of the store away from customers' view. The base station 120 may be located inside the store. Pseudolites 180 can be used within the store (where GNSS signals are blocked or weak) or outside the store (if surrounding buildings, topography, or vehicle traffic block GNSS satellite signals). Link repeaters 140 can be positioned throughout the tracking area to boost the RF signals between the base station and the mobile station.

With reference to FIG. 2A, the mobile station 160 disposed in or on the shopping cart includes non-GNSS, dead reckoning sensors 280 (e.g., a magnetic heading sensor and a rotation sensor in a cart wheel) to determine a dead-reckoning position for the cart. The cart can include a brake that, when actuated, inhibits movement of the cart. For example, a wheel of the cart may include a brake that locks or inhibits rotation of the cart wheel. The cart can also include a sensor that senses when the cart is near or passes a warning or confinement boundary. For example, the cart wheel can include an RF receiver that senses a VLF signal in a wire buried at a boundary or an RF signal from a wireless access point that transmits an exit field. As will be described with reference to the state transitions shown in FIG. 9, after receiving the boundary signal, the cart can perform a containment action (e.g., providing a warning or actuating the brake) to maintain containment of the shopping cart within the confinement area (e.g., to reduce theft of the cart).

The example state diagram in FIG. 9 shows the states of a mobile station including a GNSS portion and a dead-reckoning sensor mounted on or within a shopping cart. In the operational scenario depicted by FIG. 9, the position of a shopping cart is tracked outside the store (e.g., in the parking lot); however, this is for illustration and is not a limitation (other embodiments can track cart movement inside the store). Warning signals can be generated when a cart is within a warning area, e.g. the warning area 156 in FIG. 1. A cart brake can be actuated to inhibit movement of a cart when the cart exits a confinement area, e.g., the confinement area within the confinement boundary 148 in FIG. 1 (which may be the outer perimeter of the parking lot outside the store). A motorized cart retriever can be used to collect carts in the parking lot and return them to a cart collection area.

The example state diagram in FIG. 9 may be implemented, for example, through a mobile processor 272 in a mobile station. For the purpose of illustration, the description of FIG. 9 starts from operating state 904. This is not, however, a limitation. A mobile station may work its way through the state diagram from another operating state. Further, the state diagram in FIG. 9 is an example, and in other retail applications, the illustrated states can be combined, rearranged or left out and additional or different states may be included.

At state 904, the cart is inside the store; the GNSS portion of the cart's mobile station is inactive to conserve energy. The non-GNSS portion of the mobile station can be inactive as well, except possibly a motion detector that detects when the cart begins to move (e.g., an accelerometer or one of the dead reckoning sensors). The motion detector may be active continuously or periodically. As long as the motion detector does not detect motion exceeding a selected motion threshold, the mobile station remains in the state 904. If the motion detector detects motion exceeding a selected motion threshold, the mobile station transitions to state 908.

At the state 908, the cart's mobile station is partially awake inside the store. At least the motion detector and exit field sensor (which senses movement through the opening 136 in FIG. 1) are active. Other portions of the mobile station may or may not be active. If the motion sensor does not detect any motion exceeding a selected rest threshold (which may or may not be the same as the selected motion threshold governing transition from the state 904 to the state 908) for at least the duration of a timeout period, the state transitions back to the state 904. If the exit field sensor detects movement through the opening leading out of the store, the mobile station can set the starting coordinates for its dead reckoning sensor to coordinates associated with the opening (perhaps as detected from the exit field sensor), and the state transitions to state 912.

At the state 912, at least the exit field sensor and the dead reckoning sensor are active. The dead reckoning sensor, which includes a wheel rotation sensor, keeps a rotation count of a cart wheel. If the exit field sensor detects movement through the opening leading back into the store, the state transitions back to the state 908. If a minimum rotation count threshold is reached (indicating a minimum travel distance) while the cart is outside of the store, the state transitions to state 916.

At the state 916, the GNSS portion of the mobile station wakes up and is active and initiates a GNSS fix determination process, for example, by communicating with the base station as illustrated in FIG. 3. If the mobile station obtains a good GNSS position and the position is not within a warning area, the mobile station can update the minimum rotation count and return to the state 912. If the mobile station cannot obtain a good position fix, it may iterate within the state 916, e.g., return from block 312 to block 306 in FIG. 3. If the mobile station cannot establish a link with the base station, the mobile station may enter an autonomous mode as described above. If the mobile station obtains a good fix and the fix is within a warning area, the state transitions to state 920.

At the state 920, the mobile station provides a warning, e.g., through an audible or visual signal, to warn the person pushing the cart that the cart is nearing a confinement boundary. The dead reckoning sensor continues estimating cart position by counting wheel rotations. If the count reaches a minimum rotation count threshold applicable to the warning area, the state transitions to state 924.

At the state 924, the GNSS portion of the mobile station wakes up and is active and initiates a GNSS fix determination process, for example, as illustrated in FIG. 3. This fix determination process may have a target precision tighter than the process associated with the state 916, because it may be desirable to determine with tighter precision how close the cart is to the confinement boundary. The fix determination process may emphasize a certain direction of interest (e.g., toward the confinement boundary), such as illustrated through the open circle 656 in FIG. 6A. If the fix indicates that the cart is, for some reason, back in the store, the state transitions back to the state 908. If the fix indicates that the cart is no longer within the warning area but is still outside the store, the state transitions back to the state 912. If the fix indicates that the cart is still within the warning area, the state transitions back to the state 920 (e.g., and provides another warning). If the fix indicates that the cart is outside the confinement area, a cart confinement action can be performed. For example, a cart brake can be actuated to inhibit cart movement and/or an alarm message may be sent to the base station or to a central control unit. The state transitions to the state 928, indicating the cart is braked (or locked) outside the confinement area. If the mobile station cannot obtain a good fix, it may iterate within state 924, e.g., return from block 312 to block 306 in FIG. 3. If the mobile station cannot establish a link with the base station, the mobile station may enter an autonomous mode as described above.

At the state 928, movement of the cart to greater distances outside the confinement area has been inhibited, which may reduce or prevent theft of the cart. The cart remains in this location, waiting to be collected by a human operator or a motorized cart retriever. For example, the mobile station may wait for a retrieval message in response to the alarm message sent from the cart during the transition to the state 928. A retrieval message can be communicated to the mobile station by a human operator with a remote control or a cart retriever, which indicates that the cart should be under the custody of store personnel. The cart undergoes a retrieval process in which the cart brake may de-actuate, permitting retrieval of the car. The state transitions to state 932.

At the state 932, if the exit field sensor detects movement of the cart through the opening 136 leading back into the store during the retrieval process (e.g., by detecting the exit field 132), the state transitions back to state 908. Otherwise, the state transitions to state 916 where the mobile sensor initiates a GNSS fix determination process to obtain its location (which is presumably outside the store).

Although the foregoing example retail application is described with reference to shopping carts, this is for illustration and not limitation. In another retail application, hand-held shopping baskets can be located and tracked. Rather than using wheel rotation to measure distance, the basket may include a pedometer to estimate the customer's gait and a compass to estimate the customer's direction as part of the dead reckoning position estimation. Further, in the shopping basket application, rather than using a cart brake, the shopping basket may include an alarm that is actuated when the shopping basket leaves the confinement area.

Additionally, the low-energy GNSS technology can be used in non-retail applications that utilize human-propelled wheeled carts such as, e.g., locating warehouse carts in a warehouse environment, luggage carts in an airport, medical carts or wheeled beds in a hospital environment, and so forth.

Example Livestock Tracking Application Involving a Low-Energy Consumption GNSS Location System A low-energy consumption GNSS mobile system can be used for livestock tracking. Many of the general principles for this application are similar to what is described above for the example retail application. Some specific points of application are described below. Livestock include, but are not limited to, cattle, dairy cows, horses, or other types of domestic animals raised in a farm or an agricultural setting.

A mobile station in a livestock tracking application can comprise a GNSS portion and a dead reckoning sensor, which is used to provide a non-GNSS based location estimate. The dead reckoning sensor can comprise an accelerometer or magnetometer, plus optionally a MEMS (microelectromechanical systems) gyroscope. The mobile station components can be disposed in or on a collar to be worn by the animal or on a tag to be attached to the animal (e.g., on an ear or a leg). The tag comprising the mobile station could be attached to a collar or band worn by the animal. In some cases, the collar or tag may include solar panels to provide electrical power to the mobile station. A GNSS receiver and power supply may also be in or on the collar, although not necessarily in the same physical enclosure as the dead reckoning sensors. For example, a small printed circuit board assembly (PCBA) containing the electronics and the GNSS antenna can be disposed on the top of the collar (so that the GNSS antenna can receive signals from viewable GNSS satellites or pseudolites) and a battery compartment can be disposed at the bottom of the collar. The collar may be designed such that the PCBA can stay at or near the top, for example, by putting most of the concentrated mass of the collar at the bottom. Other designs or arrangement are possible to take into account comfort factors for the livestock or usage considerations for farm logistics.

Mobile stations attached to livestock can provide movement profiles of the livestock. Leading indicators of disease or estrus can partly be inferred from the movement profiles. These leading indicators can provide valuable information to livestock management. The collar may include a health monitor such as a body temperature sensor to further facilitate tracking health of the livestock. The mobile station can communicate the movement profiles or health information of a livestock herd to the base station or a central control unit for analysis and data mining operations. In some implementations, the mobile station includes (or is in communication with) other animal sensors such as, e.g., a thermometer, a microphone, etc.

Speed of motion of the animal can be determined by a pedometer algorithm operating on the accelerometer or magnetometer (plus optionally gyroscope) data. The pedometer algorithm can be tuned for the particular animal to which the collar is attached, e.g., to measure a cow's gait. Because there can be usually far more dead reckoning parameter variability between individual cows (or other animals) in one herd than between individual carts in the example retail application described above, machine learning can be implemented to learn the animal's gait. As described herein, the machine learning techniques can include neural networks, decision trees, support vector machines, probabilistic methods (e.g., Bayesian networks), data mining, and so forth. In machine learning, GNSS fixes using the low-energy consumption GNSS mobile system can be used to get a precise trajectory of the animal. From the precise trajectory, new parameters for the dead reckoning algorithm (e.g., gait detection) may be derived. Derivation of new dead reckoning parameters can be done in a mobile station's processor, at a base station, at a central control unit, or at a remote server connected via a network. An implementation may trade off energy consumption used for such derivation processing (e.g., reduction of raw data) in the mobile station's processor versus energy consumption used for communicating the raw data to a base station over a radio link, similar to what is described above in connection with FIG. 5.

When livestock enter or remain in an indoor structure, e.g., a barn or a milking shed, pseudolites as described above can provide precision location data associated with the livestock. Even though such a structure may be at least partially open, GNSS satellites may not be in line of sight from within such a structure, or satellite signals may be degraded within such a structure, especially for a structure covered with a metal roof.

A livestock owner such as a dairy farmer may want to use an embodiment of the GNSS location systems described herein to obtain information including: (1) when each animal goes to specific places in a structure (e.g., a barn, a milking shed, etc.) or outside (e.g., a feed trough, a water source, a sunny area, etc.); (2) how long the animal stays there and how long it spends in transit between particular areas; (3) qualification by motion signature or characteristics of how agitated or calm the animal is, or the general health of the animal, at the different spots and in the transits between locations of interest; or (4) how a herd clusters and moves together or in separate groups (e.g., animal A approached a cluster of animals B, C, and D then backed off). Such information can be useful for keeping track of the herd's social hierarchy, monitoring for instability in dominance relationships, for example. A position versus time profile for an individual animal may have less interest to the livestock owner other than as the profile may be necessary to provide the pieces of information for the owner's herd. In other cases, a livestock owner may wish to analyze a location versus time profile for certain high-value animals (e.g., a thoroughbred stallion for breeding) to track its movements and interactions with other animals (e.g., mares).

A livestock tracking application may have different system parameters than a retail store shopping cart containment application. For example, requirements for precision in location estimates may be lower in livestock tracking applications, especially if the tracking area for the livestock application (e.g., a ranch) is larger than the shopping cart containment area (e.g., a parking lot). Nonetheless, various embodiments of the low-energy GNSS movable object location system described herein can be used for either application. The foregoing are merely example applications of the disclosed GNSS technology. In other embodiments, the low-energy GNSS location technology can be used for other tracking applications (e.g., locating or tracking any type of human-propelled cart).

Additional Aspects and Examples

In a 1st aspect, a system for locating a movable object, the system comprising: a mobile station configured to be associated with the movable object, the mobile station comprising: a radio frequency (RF) mobile communication system configured to operate an RF link having an RF link frequency in an RF band that is not licensed for cellular communications; a mobile global navigation satellite system (GNSS) receiver; and a dead reckoning system including a non-GNSS sensor, the dead reckoning system configured to use measurements from the non-GNSS sensor to provide an estimated position for the mobile station; and a base station located at a fixed position, the base station comprising: a base RF communication system configured to bidirectionally communicate with the mobile communication system over the RF link; a base GNSS receiver; and a hardware processor, wherein the base station is configured to: receive, from the mobile station over the RF link, the estimated position of the mobile station determined by the dead reckoning system; determine satellite acquisition information that includes a set of GNSS satellites predicted to be viewable at the estimated position of the mobile station and GNSS code phases associated with each GNSS satellite in the set, the set of GNSS satellites including at least a minimum number of GNSS satellites; communicate, to the mobile station over the RF link, the satellite acquisition information; receive, from the mobile station over the RF link, chip transition time information associated with the set of GNSS satellites; determine, based at least in part on the chip transition time information, an updated position for the mobile station; and communicate, to the mobile station over the RF link, the updated position, and wherein the mobile station is configured to: communicate, to the base station over the RF link, the estimated position of the mobile station determined by the dead reckoning system; receive, from the base station over the RF link, the satellite acquisition information; acquire GNSS signals from at least some of the GNSS satellites in the set of GNSS satellites; determine, from the acquired GNSS signals, the chip transition time information associated with the GNSS code phases for the at least some of the GNSS satellites in the set; and communicate, to the base station over the RF link, the chip transition time information.

In a 2nd aspect, the system of aspect 1, wherein the movable object comprises a human-propelled cart having a wheel.

In a 3rd aspect, the system of aspect 2, wherein the human-propelled cart comprises a shopping cart.

In a 4th aspect, the system of aspect 2 or aspect 3, wherein the non-GNSS sensor comprises a magnetic heading sensor and a wheel rotation sensor.

In a 5th aspect, the system of aspect 1, wherein the movable object comprises a human or an animal, and the non-GNSS sensor comprises a pedometer and a magnetic heading sensor.

In a 6th aspect, the system of any one of aspects 1 to 5, wherein the RF link frequency is in a range from 426 MHz to 435 MHz, 779 MHz to 787 MHz, 863 MHz to 870 MHz, 900 MHz to 928 MHz, 2.400 GHz to 2.483 GHz, or 5.725 GHz to 5.875 GHz.

In a 7th aspect, the system of any one of aspects 1 to 6, wherein the minimum number of GNSS satellites is greater than or equal to four.

In an 8th aspect, the system of any one of aspects 1 to 7, wherein the satellite acquisition information further comprises Doppler shift information associated with the satellite in the set of GNSS satellites.

In a 9th aspect, the system of any one of aspects 1 to 8, wherein the satellite acquisition information further comprises initialization parameters for the mobile GNSS receiver, the initialization parameters including parameters for frequency lock loop or phase lock loop.

In a 10th aspect, the system of any one of aspects 1 to 9, wherein the base station is configured to rank the set of GNSS satellites according to one or more ranking criteria.

In an 11 th aspect, the system of aspect 10, wherein the ranking criteria include one or more of: whether a satellite is along a direction of movement or a direction of interest of the mobile station, whether a satellite is near a horizon of the mobile station, an altitude of a satellite above the horizon of the mobile station, a Doppler shift for a satellite, ionospheric propagation errors for a satellite, positional proximity information for at least two satellites, an antenna pattern of a mobile station GNSS antenna, or presence of obstructions near a mobile station that can inhibit reception of GNSS signals from a satellite.

In a 12th aspect, the system of any one of aspects 1 to 11, wherein the satellite acquisition information includes selection information associated with an order in which the mobile station should attempt to capture GNSS signals from satellites in the set of GNSS satellites.

In a 13th aspect, the system of aspect 12, wherein the order is based at least in part on whether a contingency occurs.

In a 14th aspect, the system of any one of aspects 1 to 13, where the base station is configured to determine the set of GNSS satellites based at least in part on reducing or minimizing a dilution of precision.

In a 15th aspect, the system of any one of aspects 1 to 14, wherein the chip transition time information further comprises a quality indicator for the at least some of the GNSS satellites in the set, the quality indicator associated with a quality of the GNSS signal received by the mobile GNSS receiver.

In a 16th aspect, the system of aspect 15, wherein the quality indicator comprises information associated with one or more of a GNSS signal power, a width of a peak in a correlator output, or a signal-to-noise ratio.

In a 17th aspect, the system of any one of aspects 1 to 16, wherein the mobile station and the base station are configured to exchange clock timing information over the RF link, and the mobile station is configured to synchronize, based at least partly on the timing information, a mobile station clock to a base station clock that is representative of time for the GNSS satellites.

In an 18th aspect, the system of aspect 17, wherein the minimum number of GNSS satellites is greater than or equal to three.

In a 19th aspect, the system of any one of aspects 1 to 18, further comprising a link repeater, wherein the mobile station and the base station are each configured to bidirectionally communicate over the RF link with the link repeater.

In a 20th aspect, the system of aspect 19, wherein the mobile station comprises a mobile station clock, the link repeater comprises a link repeater clock, and the base station comprises a base station clock that is representative of time for the GNSS satellites, and where the mobile station and the link repeater are configured to synchronize the mobile station clock with the link repeater clock, and the link repeater and the base station are configured to synchronize the link repeater clock with the base station clock.

In a 21st aspect, the system of any one of aspects 1 to 20, further comprising a pseudolite configured to communicate a navigation signal to the mobile station.

In a 22nd aspect, the system of aspect 21, wherein the mobile station is configured to: acquire the navigation signal from the pseudolite; determine a pseudolite chip transition time associated with the navigation signal, and communicate, to the base station over the RF link, the pseudolite chip transition time.

In a 23rd aspect, the system of aspect 22, wherein the base station is configured to determine the updated position of the mobile station based at least in part on the pseudolite chip transition time.

In a 24th aspect, the system of any one of aspects 21 to 23, wherein the pseudolite is configured to communicate the navigation signal at a pseudolite carrier frequency within 100 MHz of a GNSS satellite signal carrier frequency.

In a 25th aspect, the system of aspect 24, wherein the pseudolite carrier frequency is in a range from 1626.5 MHz to 1645.5 MHz.

In a 26th aspect, the system of any one of aspects 1 to 25, wherein the mobile station is configured to store sleep parameters that include a time or a condition when the mobile station is to wake up and begin to communicate to with the base station.

In a 27th aspect, the system of any one of aspects 1 to 26, wherein the mobile station is configured to: include an autonomous mode in which the mobile station computes its position using GNSS signals acquired from GNSS satellites; and operate in the autonomous mode if the mobile station is unable to receive communications from the base station over the RF link.

In a 28th aspect, the system of any one of aspects 1 to 27, wherein the base station includes a network connection to a data source that provides one or more of: GNSS ephemerides, GNSS almanacs, ionospheric models, or weather conditions.

In a 29th aspect, the system of any one of aspects 1 to 28, wherein the base station is configured to obtain information relating to satellite acquisition by the mobile station.

In a 30th, the system of aspect 29, wherein the system is configured to analyze the information relating to satellite acquisition by the mobile station using a machine learning technique to update a model of a tracking area in which the movable object moves, conditions associated with the mobile station, or the determination of the set of GNSS satellites predicted to be viewable at the estimated position of the mobile station.

In a 31st aspect, the system of any one of aspects 1 to 30, wherein to determine the chip transition time information associated with the GNSS code phases for the at least some of the GNSS satellites in the set, the mobile station is configured to search for a chip transition within a shift window based at least partly on an estimate of an error in clock synchronization between the mobile station and the base station.

In a 32nd aspect, the system of aspect 31, wherein the shift window is in a range from 0.5 µs to 10 µs or in a range from 1 µs to 1000 µs.

In a 33rd aspect, the system of any one of aspects 1 to 32, in which the GNSS comprises the Global Positioning System (GPS), and the mobile and base GNSS receivers comprise GPS receivers. In the system of any one of aspects 1 to 33, the base station includes a power source comprising a mains power source, and the mobile station includes a power source comprising a non-mains power source. The non-mains power source can comprise a battery, a capacitor (e.g., an ultracapacitor or a supercapacitor), or a solar cell.

In a 34th aspect, a method for locating a movable object, the method performed by a mobile station configured to be associated with the movable object and a base station located at a fixed position, the mobile station and the base station configured to bidirectionally communicate over a radio frequency (RF) link having an RF link frequency in an RF band that is not licensed for cellular communications, the method comprising: determining, by the mobile station via a dead reckoning technique, an estimated position of the mobile station; communicating, by the mobile station over the RF link, the estimated position of the mobile station; receiving, by the base station over the RF link, the estimated position; determining, by the base station, satellite acquisition information that includes a set of global navigation satellite system (GNSS) satellites predicted to be viewable at the estimated position of the mobile station and GNSS code phases associated with each GNSS satellite in the set, the set of GNSS satellites including at least a minimum number of GNSS satellites; communicating, by the base station over the RF link, the satellite acquisition information to the mobile station; acquiring, by the mobile station, GNSS signals from at least some of the GNSS satellites in the set of GNSS satellites; determining, by the mobile station and from the acquired GNSS signals, chip transition time information associated with the GNSS code phases for the at least some of the GNSS satellites in the set; communicating, by the mobile station over the RF link, the chip transition time information to the base station; determining, by the base station based at least in part on the chip transition time information, an updated position for the mobile station; and communicating, by the base station over the RF link, the updated position to the mobile station.

In a 35th aspect, the method of aspect 34, wherein the movable object comprises a human-propelled cart having a wheel.

In a 36th aspect, the method of aspect 35, wherein the human-propelled cart comprises a shopping cart.

In a 37th aspect, the method of aspect 34 or aspect 35, wherein determining, by the mobile station via a dead reckoning technique, an estimated position of the mobile station comprises using measurements from a magnetic heading sensor and a wheel rotation sensor to determine the estimated position.

In a 38th aspect, the method of aspect 34, wherein the movable object comprises a human or an animal, and wherein determining, by the mobile station via a dead reckoning technique, an estimated position of the mobile station comprises using at least a pedometer to determine the estimated position.

In a 39th aspect, the method of any one of aspects 34 to 38, wherein the RF link frequency is in a range from 426 MHz to 435 MHz, 779 MHz to 787 MHz, 863 MHz to 870 MHz, 900 MHz to 928 MHz, 2.400 GHz to 2.483 GHz, or 5.725 GHz to 5.875 GHz.

In a 40th aspect, the method of any one of aspects 34 to 39, further comprising ranking, by the base station, the set of GNSS satellites according to one or more ranking criteria.

In a 41st aspect, the method of aspect 40, wherein the ranking criteria include one or more of: whether a satellite is along a direction of movement or a direction of interest of the mobile station, whether a satellite is near a horizon of the mobile station, an altitude of a satellite above the horizon of the mobile station, a Doppler shift for a satellite, ionospheric propagation errors for a satellite, positional proximity information for at least two satellites, an antenna pattern of a mobile station GNSS antenna, or presence of obstructions near a mobile station that can inhibit reception of GNSS signals from a satellite.

In a 42nd aspect, the method of any one of aspects 34 to 41, further comprising determining, by the base station, selection information associated with an order in which the mobile station should attempt to capture GNSS signals from satellites in the set of GNSS satellites.

In a 43rd aspect, the method of any one of aspects 34 to 42, wherein determining, by the base station, satellite acquisition information that includes a set of GNSS satellites predicted to be viewable at the estimated position of the mobile station comprises determining the set of GNSS satellites based at least in part on reducing or minimizing a dilution of precision.

In a 44th aspect, the method of any one of aspects 34 to 43, wherein determining, by the mobile station and from the acquired GNSS signals, chip transition time information associated with the GNSS code phases for the at least some of the GNSS satellites in the set comprises calculating a quality indicator for the at least some of the GNSS satellites in the set, the quality indicator associated with a quality of the GNSS signal received by the mobile station.

In a 45th aspect, the method of aspect 44, wherein the quality indicator comprises information associated with one or more of a GNSS signal power, a width of a peak in a correlator output, or a signal-to-noise ratio.

In a 46th aspect, the method of any one of aspects 34 to 45, further comprising: exchanging, between the mobile station and the base station, clock timing information over the RF link; and synchronizing, by the mobile station, based at least partly on the timing information, a mobile station clock to a base station clock that is representative of time for the GNSS satellites.

In a 47th aspect, the method of any one of aspects 34 to 46, further comprising: synchronizing, between the mobile station and a link repeater, a mobile station clock with a link repeater clock; and synchronizing, between the link repeater and the base station, the link repeater clock with a base station clock that is representative of time for the GNSS satellites.

In a 48th aspect, the method of any one of aspects 34 to 47, further comprising: acquiring, by the mobile station, a navigation signal from a pseudolite; determining, by the mobile station, a pseudolite chip transition time associated with the navigation signal; communicating, by the mobile station over the RF link to the base station, the pseudolite chip transition time; and determining, by the base station, the updated position of the mobile station based at least in part on the pseudolite chip transition time.

In a 49th aspect, the method of aspect 48, wherein the navigation signal is at a pseudolite carrier frequency within 100 MHz of a GNSS satellite signal carrier frequency.

In a 50th aspect, the method of aspect 49, wherein the pseudolite carrier frequency is in a range from 1626.5 MHz to 1645.5 MHz.

In a 51st aspect, the method of any one of aspects 34 to 50, wherein determining, by the mobile station and from the acquired GNSS signals, chip transition time information associated with the GNSS code phases for the at least some of the GNSS satellites in the set comprises searching for a chip transition within a shift window based at least partly on an estimate of an error in clock synchronization between the mobile station and the base station. In other aspects, the method of any one of aspects 34 to 51 is such that the base station includes a power source comprising a mains power source, and the mobile station includes a power source comprising a non-mains power source. The non-mains power source can comprise a battery, a capacitor (e.g., an ultracapacitor or a supercapacitor), or a solar cell.

In a 52nd aspect, the location system for movable objects, the location system using a global navigation satellite system (GNSS), the location system comprising: a mobile station configured to be associated with the movable object, the mobile station comprising: a mobile GNSS receiver configured to receive GNSS signals; a mobile transceiver configured to communicate over a communication link comprising a frequency in an unlicensed radio frequency (RF) band; a non-transitory data store configured to store computer-executable instructions; and a hardware processor coupled to the non-transitory data store, wherein the computer-executable instructions, when executed by the hardware processor, cause the mobile station to: wake up at a time or under one or a plurality of conditions specified in sleep parameters; estimate a position of the mobile station; transmit the estimated position of the mobile station and a local mobile clock value to a base station via the mobile transceiver; receive information associated with GNSS clock and acquisition parameters from the base station; update the local mobile clock value based at least in part on the information associated with GNSS clock; cause the mobile GNSS receiver to acquire GNSS signals, based at least in part on the acquisition parameters; transmit information related to chip transitions in the acquired GNSS signals to the base station; receive an updated position and information associated with updated sleep parameters from the base station; update the sleep parameters based at least in part on the information associated with updated sleep parameters from the base station; and return to sleep. The location system also comprises a base station, comprising: a base GNSS receiver configured to receive signals from a plurality of GNSS satellites; a base transceiver configured to communicate over the communication link comprising the frequency in the unlicensed radio frequency (RF) band; a non-transitory data store configured to store computer-executable instructions; and a hardware processor coupled to the non-transitory data store, wherein the computer-executable instructions, when executed by the hardware processor, cause the base station to: receive the estimated position and the local clock value of the mobile station through the communication link; transmit one or more messages associated with updating the local mobile station clock value to a base station clock value that is representative of time for the GNSS satellites; estimate acquisition parameters of GNSS satellites based at least in part on the estimated position of the mobile station; transmit, via the communication link to the mobile station, a ranked list of GNSS satellites with associated code phase information; receive, via the communication link, the chip transitions from the mobile receiver; calculate the updated position of the mobile station using at least the chip transitions from the mobile receiver; and transmit the updated position and information associated with the updated sleep parameters to the mobile station.

In a 53rd aspect, the location system of aspect 52, wherein the mobile station comprises one or more non-GNSS sensors including a Very Low Frequency (VLF) sensor, a rotation sensor, a vibration sensor, a heading sensor, a magnetic field sensor, an optical sensor, an RF sensor, an Electronic Article Surveillance (EAS) sensor, an ultrasonic sensor, an accelerometer, or a gyroscope.

In a 54th aspect, the location system of aspect 53, wherein the mobile station is configured to estimate its initial position after exiting a sleep mode based at least in part on information provided by the one or more non-GNSS position sensors.

In a 55th aspect, the method for locating a movable object, the method comprising: under control of a mobile station configured to be attached to or included in or on the movable object, the mobile station comprising a global navigation satellite system (GNSS) receiver and a transceiver configured to bidirectionally communicate over a radio frequency (RF) link having an RF link frequency in an RF band that is not licensed for cellular communications: determining by a non-GNSS technique an estimated position of the mobile station; communicating, over the RF link, the estimated position of the mobile station; receiving, over the RF link, satellite acquisition information that includes a set of GNSS satellites predicted to be viewable at the estimated position of the mobile station and GNSS code phases associated with each GNSS satellite in the set; acquiring GNSS signals from at least some of the GNSS satellites in the set of GNSS satellites; determining, based at least in part from the acquired GNSS signals, chip transition time information associated with the GNSS code phases for the at least some of the GNSS satellites in the set; communicating, over the RF link, the chip transition time information; and receiving, over the RF link, an updated position for the mobile station, the updated position determined based at least partly on the chip transition time information.

In a 56th aspect, the method of aspect 55, wherein determining by a non-GNSS technique an estimated position of the mobile station comprises determining the estimated position via a dead reckoning method.

In a 57th aspect, the method of aspect 55 or aspect 56, further comprising synchronizing a clock of the mobile station to a clock that is representative of time of the GNSS satellites.

In a 58th aspect, the method of any one of aspects 55 to 57, wherein determining chip transition time information associated with the GNSS code phases for the at least some of the GNSS satellites in the set comprises calculating a quality indicator for the at least some of the GNSS satellites in the set, the quality indicator associated with a quality of the GNSS signal received by the mobile station.

In a 59th aspect, the method of aspect 58, wherein the quality indicator comprises information associated with one or more of a GNSS signal power, a width of a peak in a correlator output, or a signal-to-noise ratio.

In a 60th aspect, the method of any one of aspects 55 to 59, further comprising: acquiring a navigation signal from a pseudolite; determining a pseudolite chip transition time associated with the navigation signal; and communicating, over the RF link, the pseudolite chip transition time.

In a 61st aspect, the method of any one of aspects 55 to 60, further comprising determining a position from GNSS signals from GNSS satellites if the mobile station is unable to communicate over the RF link.

In a 62nd aspect, the method of any one of aspects 55 to 61, wherein determining chip transition time information comprises searching for a chip transition within a shift window based at least partly on an estimate of an error in clock synchronization.

In a 63rd aspect, a mobile station configured to be attached to or included in or on the movable object, the mobile station comprising the global navigation satellite system (GNSS) receiver and the transceiver configured to bidirectionally communicate over a radio frequency (RF) link having an RF link frequency in an RF band that is not licensed for cellular communications, the mobile station configured to perform the method of any one of aspects 55 to 62.

In a 64th aspect, a method for locating a movable object, the method comprising: under control of a base station comprising a global navigation satellite system (GNSS) receiver and a transceiver configured to bidirectionally communicate over a radio frequency (RF) link having an RF link frequency in an RF band that is not licensed for cellular communications: receiving, over the RF link, an estimated position for the movable object; determining satellite acquisition information that includes a set of global navigation satellite system (GNSS) satellites predicted to be viewable at the estimated position of the movable object and GNSS code phases associated with each GNSS satellite in the set; communicating, over the RF link, the satellite acquisition information; receiving, over the RF link, chip transition time information associated with the GNSS code phases acquired from at least some of the GNSS satellites in the set; determining, based at least in part on the chip transition time information, an updated position for the movable object; and communicating, over the RF link, the updated position.

In a 65th aspect, the method of aspect 64, further comprising synchronizing a clock of the base station to a clock associated with the GNSS satellites.

In a 66th aspect, the method of aspect 64 or aspect 65, further comprising ranking the set of GNSS satellites according to one or more ranking criteria.

In a 67th aspect, the method of aspect 66, wherein the ranking criteria include one or more of: whether a satellite is along a direction of movement or a direction of interest of the movable object, whether a satellite is near a horizon of the movable object, an altitude of a satellite above the horizon of the movable object, a Doppler shift for a satellite, ionospheric propagation errors for a satellite, positional proximity information for at least two satellites, an antenna pattern of a GNSS antenna, or presence of obstructions near the movable object that can inhibit reception of GNSS signals from a satellite.

In a 68th aspect, the method of any one of aspects 64 to 67, wherein determining the satellite acquisition information comprises determining selection information associated with an order in which GNSS signals from satellites in the set of GNSS satellites should be attempted to be acquired.

In a 69th aspect, the method of any one of aspects 64 to 68, where determining satellite acquisition information comprises determining the set of GNSS satellites based at least in part on reducing or minimizing a dilution of precision.

In a 70th aspect, a base station comprising the global navigation satellite system (GNSS) receiver and the transceiver configured to bidirectionally communicate over a radio frequency (RF) link having an RF link frequency in an RF band that is not licensed for cellular communications, the base station configured to perform the method of any one of aspects 64 to 69.

In a 71st aspect, a system for analyzing satellite acquisition data, the system comprising: non-transitory data storage configured to store satellite acquisition data related to attempts by mobile stations capable of moving in a tracking area to acquire signals from global navigation satellite system (GNSS) satellites; and a hardware processor in communication with the non-transitory data storage, the hardware processor programmed to: analyze the satellite acquisition data using a machine learning algorithm, and perform one or more of the following base at least in part on the machine learning analysis: update a model of the tracking area, or update GNSS satellite selection criteria for the mobile stations.

In a 72nd aspect, the system of aspect 71, wherein the hardware processor is programmed to access geographic information system (GIS) information for the tracking area.

In a 73rd aspect, the system of aspect 71 or aspect 72, wherein the hardware processor is programmed to infer, from the machine learning analysis, a presence of an obstacle that inhibits reception of GNSS satellite signals at a particular position in the tracking area or in a particular direction.

In a 74th aspect, a pseudolite for communicating a navigation signal, the pseudolite comprising: a transmitter configured to communicate the navigation signal at a pseudolite carrier frequency within 100 MHz of a global navigation satellite system (GNSS) satellite signal carrier frequency.

In a 75th aspect, the pseudolite of aspect 74, wherein the pseudolite carrier frequency is in a range from 1626.5 MHz to 1645.5 MHz.

In a 76th aspect, the pseudolite of aspect 74 or aspect 75, wherein the navigation signal comprises a timing code that is modulated onto the pseudolite carrier frequency.

In a 77th aspect, the pseudolite of aspect 76, wherein the timing code comprises a pseudorandom noise (PRN) code.

In a 78th aspect, a receiver configured to operate with the pseudolite of any one of aspects 74 to 77, wherein the receiver comprises circuitry configured to receive both the GNSS satellite signal carrier frequency and the pseudolite carrier frequency.

In a 79th aspect, the receiver of aspect 78, wherein the GNSS satellite signal carrier frequency is in a range from 1560 MHz to 1590 MHz, and the pseudolite carrier frequency is in a range from 1626.5 MHz to 1645.5 MHz.

Additional Information

The various illustrative logical blocks, modules, and processes described herein may be implemented or performed by a machine, such as a computer, a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, a controller, microcontroller, state machine, combinations of the same, or the like. A processor may also be implemented as a combination of computing devices, e.g., a combination of a DSP and a microprocessor, a plurality of microprocessors or processor cores, one or more graphics or stream processors, one or more microprocessors in conjunction with a DSP, or any other such configuration.

Further, certain implementations of the object location systems of the present disclosure are sufficiently mathematically, computationally, or technically complex that application-specific hardware (e.g., FPGAs or ASICs) or one or more physical computing devices (utilizing appropriate executable instructions) may be necessary to perform the functionality, for example, due to the volume or complexity of the calculations involved (e.g., analyzing the GNSS acquisition data or the object location information collected from a large number of movable objects) or to provide results (e.g., statistical information on the object locations) substantially in real-time.

The blocks or states of the processes described herein may be embodied directly in hardware, in a software module stored in a non-transitory memory and executed by a hardware processor, or in a combination of the two. For example, each of the processes described above may also be embodied in, and fully automated by, software modules (stored in a memory) executed by one or more machines such as computers or computer processors. A module may reside in a non-transitory computer readable medium such as RAM, flash memory, ROM, EPROM, EEPROM, registers, hard disk, an optical disc, memory capable of storing firmware, or any other form of computer-readable (e.g., storage) medium. A computer-readable medium can be coupled to a processor such that the processor can read information from, and write information to, the computer-readable medium. In the alternative, the computer-readable medium may be integral to the processor. The processor and the computer-readable medium may reside in an ASIC. The computer-readable medium may include non-transitory data storage (e.g., a hard disk, non-volatile memory, etc.).

The processes, methods, and systems may be implemented in a network (or distributed) computing environment. For example, the central control unit or base station may be implemented in a distributed, networked, computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network, a terrestrial or satellite network, or any other type of communication network.

Depending on the embodiment, certain acts, events, or functions of any of the processes or methods described herein can be performed in a different sequence, may be added, merged, or left out altogether. Thus, in certain embodiments, not all described acts or events are necessary for the practice of the processes. Moreover, in certain embodiments, acts or events may be performed concurrently, e.g., through multi-threaded processing, interrupt processing, or via multiple processors or processor cores, rather than sequentially. In any apparatus, system, or method, no element or act is necessary or indispensable to all embodiments, and the disclosed apparatus, systems, and methods can be arranged differently than shown or described.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present. The articles "a" or "an" or "the" when referring to an element means one or more of the element, unless the context clearly indicates otherwise.

While the above detailed description has shown, described, and pointed out novel features as applied to various embodiments, it will be understood that various omissions, substitutions, and changes in the form and details of the logical blocks, modules, and processes illustrated may be made without departing from the spirit of the disclosure. As will be recognized, certain embodiments of the inventions described herein may be embodied within a form that does not provide all of the features and benefits set forth herein, as some features may be used or practiced separately from others.

What is claimed is:

1. A system for locating a movable object, the system comprising:
   a mobile station configured to be associated with the movable object, the mobile station comprising:
      a radio frequency (RF) mobile communication system configured to operate an RF link having an RF link frequency in an RF band that is not licensed for cellular communications;
      a mobile station clock;
      a mobile global navigation satellite system (GNSS) receiver; and
      a dead reckoning system including a non-GNSS sensor, the dead reckoning system configured to use measurements from the non-GNSS sensor to provide an estimated position for the mobile station; and
   a base station located at a fixed position, the base station comprising:
      a base RF communication system configured to bidirectionally communicate with the mobile communication system over the RF link;
      a base station clock;
      a base GNSS receiver; and
      a hardware processor,
   wherein the base station is configured to:
      receive, from the mobile station over the RF link, the estimated position of the mobile station determined by the dead reckoning system;
      determine satellite acquisition information that includes a set of GNSS satellites predicted to be viewable at the estimated position of the mobile station and GNSS code phases associated with each GNSS satellite in the set, the set of GNSS satellites including at least a minimum number of GNSS satellites;
      synchronize the base station clock to a time representative of the set of GNSS satellites;
      communicate, to the mobile station over the RF link, the satellite acquisition information;
      receive, from the mobile station over the RF link, chip transition time information associated with the set of GNSS satellites;
      determine, based at least in part on the chip transition time information, an updated position for the mobile station; and
      communicate, to the mobile station over the RF link, the updated position, and
   wherein the mobile station is configured to:
      communicate, to the base station over the RF link, the estimated position of the mobile station determined by the dead reckoning system;
      exchange, with the base station over the RF link, clock timing information;
      synchronize, based at least partly on the clock timing information, the mobile station clock to the base station clock that is representative of the time for the set of GNSS satellites;
      receive, from the base station over the RF link, the satellite acquisition information;
      wake up the mobile GNSS receiver;
      acquire, by the mobile GNSS receiver based on timing of a GNSS code phase transition, GNSS signals from at least some of the GNSS satellites in the set of GNSS satellites;
      put the mobile GNSS receiver to sleep;
      determine, from the acquired GNSS signals, the chip transition time information associated with the GNSS code phases for the at least some of the GNSS satellites in the set; and
      communicate, to the base station over the RF link, the chip transition time information.

2. The system of claim 1, wherein the movable object comprises a human-propelled cart having a wheel, and the non-GNSS sensor comprises a magnetic heading sensor and a wheel rotation sensor.

3. The system of claim 1, wherein the movable object comprises a human or an animal, and the non-GNSS sensor comprises a pedometer and a magnetic heading sensor.

4. The system of claim 1, wherein the RF link frequency is in a range from 426 MHz to 435 MHz, 779 MHz to 787 MHz, 863 MHz to 870 MHz, 900 MHz to 928 MHz, 2.400 GHz to 2.483 GHz, or 5.725 GHz to 5.875 GHz.

5. The system of claim 1, wherein the satellite acquisition information further comprises Doppler shift information associated with the satellite in the set of GNSS satellites.

6. The system of claim 1, wherein the base station is configured to rank the set of GNSS satellites according to one or more ranking criteria, wherein the ranking criteria include one or more of: whether a satellite is along a direction of movement or a direction of interest of the mobile station, whether a satellite is near a horizon of the mobile station, an altitude of a satellite above the horizon of the mobile station, a Doppler shift for a satellite, ionospheric propagation errors for a satellite, positional proximity information for at least two satellites, an antenna pattern of a mobile station GNSS antenna, or presence of obstructions near a mobile station that can inhibit reception of GNSS signals from a satellite.

7. The system of claim 1, wherein the satellite acquisition information includes selection information associated with an order in which the mobile station should attempt to capture GNSS signals from satellites in the set of GNSS satellites.

8. The system of claim 7, wherein the order is based at least in part on whether a contingency occurs.

9. The system of claim 1, where the base station is configured to determine the set of GNSS satellites based at least in part on reducing or minimizing a dilution of precision.

10. The system of claim 1, wherein the chip transition time information further comprises a quality indicator for the at least some of the GNSS satellites in the set, the quality indicator associated with a quality of the GNSS signal received by the mobile GNSS receiver, wherein the quality indicator comprises information associated with one or more of a GNSS signal power, a width of a peak in a correlator output, or a signal-to-noise ratio.

11. The system of claim 1, further comprising a link repeater, wherein the mobile station and the base station are each configured to bidirectionally communicate over the RF link with the link repeater.

12. The system of claim 11, wherein the mobile station comprises a mobile station clock, the link repeater comprises a link repeater clock, and the base station comprises a base station clock that is representative of time for the GNSS satellites, and where the mobile station and the link repeater are configured to synchronize the mobile station clock with the link repeater clock, and the link repeater and the base station are configured to synchronize the link repeater clock with the base station clock.

13. The system of claim 1, further comprising a pseudolite configured to communicate a navigation signal to the mobile station, and wherein the mobile station is configured to:
acquire the navigation signal from the pseudolite;
determine a pseudolite chip transition time associated with the navigation signal; and
communicate, to the base station over the RF link, the pseudolite chip transition time.

14. The system of claim 13, wherein the base station is configured to determine the updated position of the mobile station based at least in part on the pseudolite chip transition time.

15. The system of claim 13, wherein the pseudolite is configured to communicate the navigation signal at a pseudolite carrier frequency within 100 MHz of a GNSS satellite signal carrier frequency.

16. The system of claim 15, wherein the pseudolite carrier frequency is in a range from 1626.5 MHz to 1645.5 MHz.

17. The system of claim 1, wherein the mobile station is configured to store sleep parameters that include a time or a condition when the mobile station is to wake up and begin to communicate to with the base station.

18. The system of claim 1, wherein the mobile station is configured to:
include an autonomous mode in which the mobile station computes its position using GNSS signals acquired from GNSS satellites; and
operate in the autonomous mode if the mobile station is unable to receive communications from the base station over the RF link.

19. The system of claim 1, wherein:
the base station is configured to obtain information relating to satellite acquisition by the mobile station, and
the system is configured to analyze the information relating to satellite acquisition by the mobile station using a machine learning technique to update a model of a tracking area in which the movable object moves, conditions associated with the mobile station, or the determination of the set of GNSS satellites predicted to be viewable at the estimated position of the mobile station.

20. The system of claim 1, wherein to determine the chip transition time information associated with the GNSS code phases for the at least some of the GNSS satellites in the set, the mobile station is configured to search for a chip transition within a shift window based at least partly on an estimate of an error in clock synchronization between the mobile station and the base station.

21. The system of claim 1, wherein the base station is configured to continuously synchronize the base station clock to a time representative of the set of GNSS satellites.

22. A method for locating a movable object, the method performed by a mobile station configured to be associated with the movable object and a base station located at a fixed position, the mobile station and the base station configured to bidirectionally communicate over a radio frequency (RF) link having an RF link frequency in an RF band that is not licensed for cellular communications, the method comprising:
determining, by the mobile station via a dead reckoning technique, an estimated position of the mobile station;
communicating, by the mobile station over the RF link, the estimated position of the mobile station;
receiving, by the base station over the RF link, the estimated position;
determining, by the base station, satellite acquisition information that includes a set of global navigation satellite system (GNSS) satellites predicted to be viewable at the estimated position of the mobile station and GNSS code phases associated with each GNSS satellite in the set, the set of GNSS satellites including at least a minimum number of GNSS satellites;
synchronizing, by the base station, a base station clock to a time representative of the set of GNSS satellites;
communicating, by the base station over the RF link, the satellite acquisition information to the mobile station;
exchanging, by the mobile station and the base station over the RF link, clock timing information;
synchronizing, by the mobile station based at least partly on the clock timing information, a mobile station clock to the base station clock that is representative of the time for the set of GNSS satellites;
waking up, by the mobile station, a mobile GNSS receiver in the mobile station;
acquiring, by the mobile GNSS receiver based on timing of a GNSS code phase transition, GNSS signals from at least some of the GNSS satellites in the set of GNSS satellites;
putting to sleep, by the mobile station, the mobile GNSS receiver;
determining, by the mobile station and from the acquired GNSS signals, chip transition time information associated with the GNSS code phases for the at least some of the GNSS satellites in the set;
communicating, by the mobile station over the RF link, the chip transition time information to the base station;
determining, by the base station based at least in part on the chip transition time information, an updated position for the mobile station; and
communicating, by the base station over the RF link, the updated position to the mobile station.

23. The method of claim 22, wherein determining, by the mobile station via a dead reckoning technique, an estimated position of the mobile station comprises using measurements from a magnetic heading sensor and a wheel rotation sensor to determine the estimated position.

24. The method of claim 22, wherein the movable object comprises a human or an animal, and wherein determining, by the mobile station via a dead reckoning technique, an estimated position of the mobile station comprises using at least an accelerometer to determine the estimated position.

25. The method of claim 22, wherein the RF link frequency is in a range from 426 MHz to 435 MHz, 779 MHz to 787 MHz, 863 MHz to 870 MHz, 900 MHz to 928 MHz, 2.400 GHz to 2.483 GHz, or 5.725 GHz to 5.875 GHz.

26. The method of claim 22, further comprising ranking, by the base station, the set of GNSS satellites according to one or more ranking criteria.

27. The method of claim 22, wherein determining, by the base station, satellite acquisition information that includes a set of GNSS satellites predicted to be viewable at the estimated position of the mobile station comprises determining the set of GNSS satellites based at least in part on reducing or minimizing a dilution of precision.

28. The method of claim 22, wherein determining, by the mobile station and from the acquired GNSS signals, chip transition time information associated with the GNSS code phases for the at least some of the GNSS satellites in the set comprises calculating a quality indicator for the at least some of the GNSS satellites in the set, the quality indicator associated with a quality of the GNSS signal received by the mobile station.

29. The method of claim 22, further comprising:
exchanging, between the mobile station and the base station, clock timing information over the RF link; and
synchronizing, by the mobile station, based at least partly on the timing information, a mobile station clock to a base station clock that is representative of time for the GNSS satellites.

30. The method of claim 22, wherein the synchronizing, by the base station, a base station clock to a time representative of the set of GNSS satellites is performed continuously.

* * * * *